United States Patent [19]

Motley et al.

[11] 3,906,347

[45] Sept. 16, 1975

[54] TRANSVERSAL EQUALIZER FOR USE IN DOUBLE SIDEBAND QUADRATURE AMPLITUDE MODULATED SYSTEM

[75] Inventors: David M. Motley, Santa Ana; King Y. Cheng, Tustin, both of Calif.

[73] Assignee: Hycom Incorporated, Irvine, Calif.

[22] Filed: Oct. 11, 1973

[21] Appl. No.: 405,290

[52] U.S. Cl. .................... 325/42; 328/163; 333/18

[51] Int. Cl.² ............................................ H04B 3/04

[58] Field of Search ................ 333/18, 28 R, 70 T; 325/42, 65, 320, 321, 473, 477; 340/347 DD; 328/162, 163

[56] References Cited

UNITED STATES PATENTS

| | | | |
|---|---|---|---|
| 3,356,955 | 12/1967 | Mohn et al. | 328/163 X |
| 3,573,623 | 4/1971 | Bannon et al. | 333/18 UX |
| 3,609,597 | 9/1971 | Moye | 333/18 |
| 3,614,623 | 10/1971 | McAuliffe | 325/65 X |
| 3,727,136 | 4/1973 | Schroeder et al. | 333/18 X |
| 3,727,153 | 4/1973 | McAuliffe | 333/70 T X |
| 3,755,738 | 8/1973 | Gitlin et al. | 333/18 X |

*Primary Examiner*—Paul L. Gensler
*Attorney, Agent, or Firm*—Gordon L. Peterson

[57] ABSTRACT

A transversal equalizer for correcting asymmetrical and symmetrical delay and attenuation distortion of data samples in a transmitted signal includes a plurality of shift registers for sequentially storing the detected data samples. A plurality of multipliers, each associated with one of the registers, provide variable multiplying coefficients for sequentially multiplying each of the detected data samples to provide a plurality of products. These products are combined in a manner providing for the correction of the distortion. Error signals independently derived from partial response detected data signals are used to update the multiplying coefficients of the multipliers to correct for variations in the distortion.

12 Claims, 11 Drawing Figures

Fig. 5 (Equalization Network)

FIG. 7
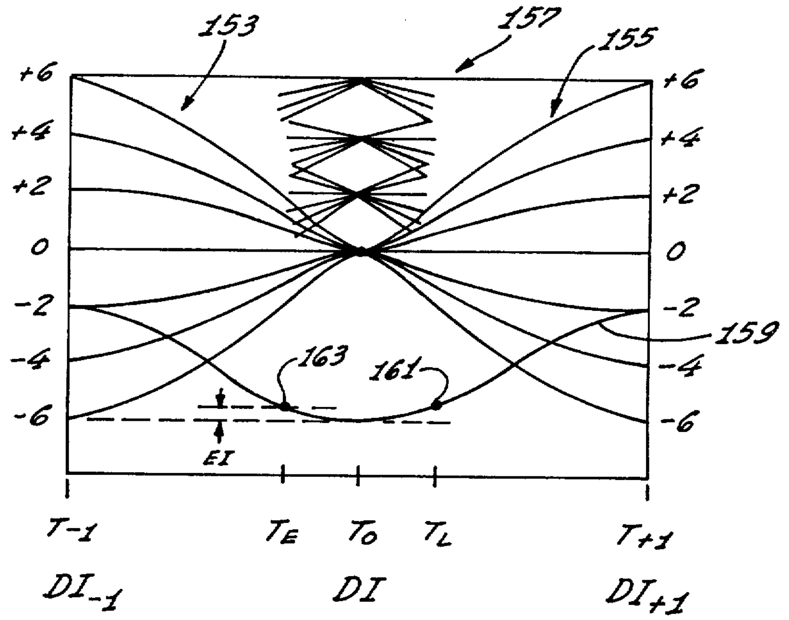
FIG. 8 (Timing Control Network -166-)
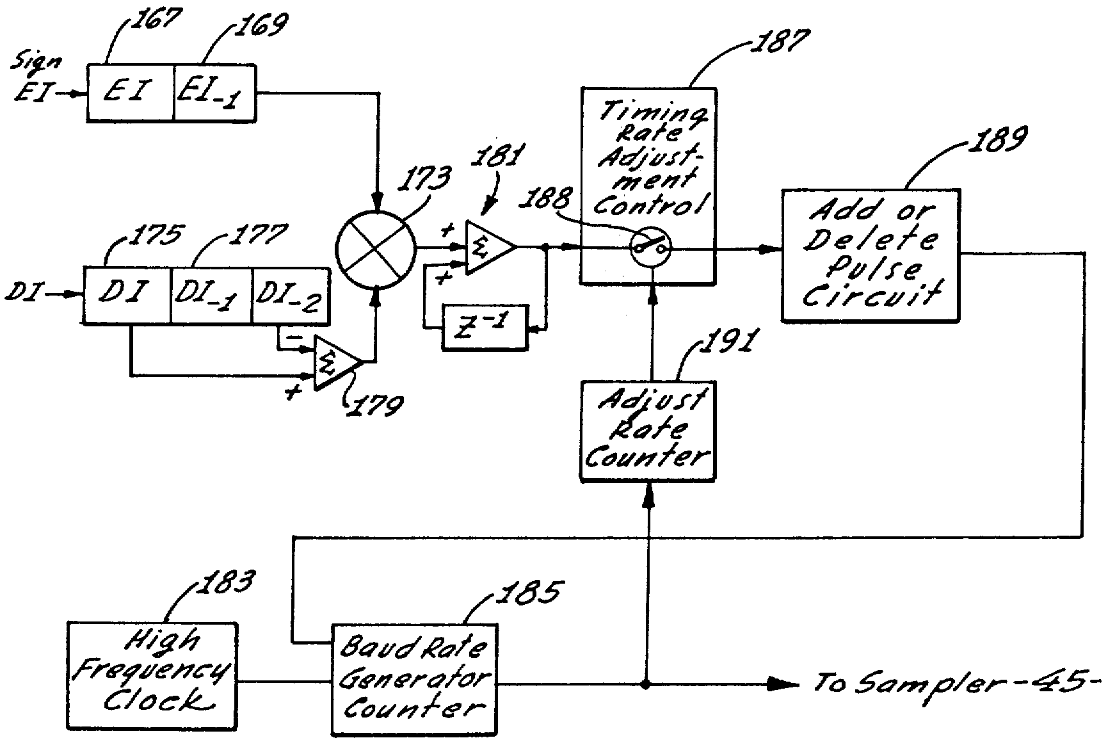

FIG. 9 (Decision Threshold Control -77-)
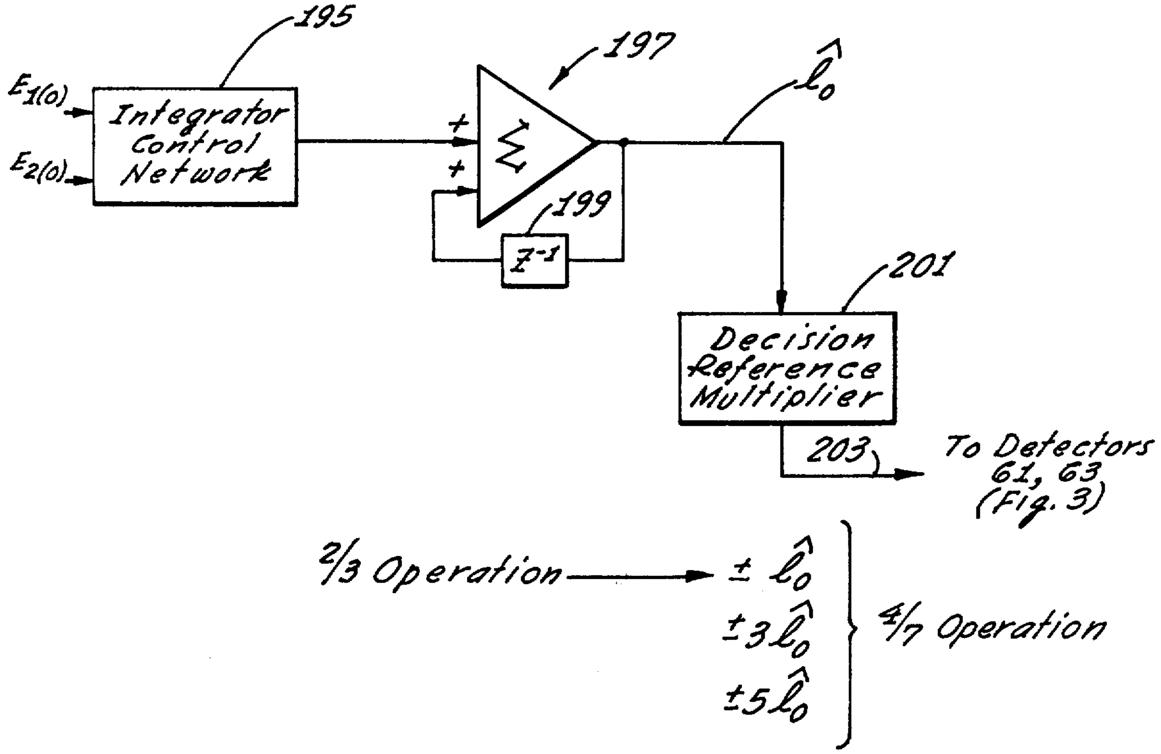
FIG. 10
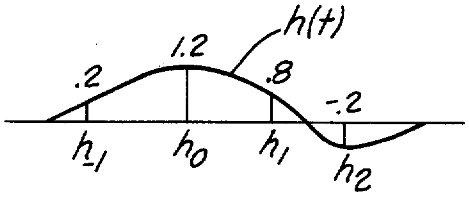

TRANSVERSAL EQUALIZER FOR USE IN DOUBLE SIDEBAND QUADRATURE AMPLITUDE MODULATED SYSTEM

BACKGROUND OF THE INVENTION

1. Field of the Invention

This invention relates generally to transversal equalizers for correcting delay and attenuation distortion of a transmitted signal and more specifically to the use of such an equalizer in a digitally implemented, double sideband quadrature amplitude modulated modem.

2. Description of the Prior Art

With the advent of large scale digital data processing systems it has become increasingly desirable to transmit such data over large distances with a high degree of accuracy. For example, a retail store chain might have a central warehouse facility with which each of the stores might advantageously communicate to maintain its respective inventory. A branch bank might also find it desirable to transmit accounting data to a central accounting facility.

Particularly in the latter example, the accuracy of the transmission is of paramount importance. To enhance the accuracy of digital transmissions, the data has been transmitted in blocks of rows and columns each having a parity bit which indicates whether the data in that row or column was accurately transmitted. Ideally, when the parity bits indicate there has been an error in transmission, the receiver requests that the data be retransmitted. This request is preferably made through a secondary channel so that the receiver can communicate with the transmitter as the data is being transmitted. This can substantially reduce the time needed for transmission since each erroneous block of data can be immediately retransmitted.

It has been desirable to transmit the data over telephone lines because of their availability and wide distribution. However, a telephone line is well known to have a passband which at best is limited and may be even furather degraded depending upon the age and quality of the line. For this reason, data transmission systems of the prior art, which have generally required relatively wide passbands, have typically occupied the entire passband of the telephone line. It follows that those telephone lines having significantly degraded passbands have been unacceptable for this type of transmission. These telephone lines of poor quality have been particularly apparent where a system has used a portion of the telephone passband to accommodate a secondary channel for system control.

Due primarily to the wide variation in the passbands of the dial-up type of telephone lines, such lines have generally not been used for the transmission of digital data. Rather, telephone lines have typically been leased in order to obtain a guarantee of the passband quality. Leased telephone lines have not been satisfactory for a number of reasons. First, leased lines are very expensive. Second, leased lines are generally not used 100 percent of the time so that often the high cost must be prorated over a relatively short period of use. Third, it has been more difficult to maintain the confidentiality of data transmitted on a leased line since such a line is more vulnerable to being tapped. This is of particular importance to a bank which must insure the secrecy of its records.

Any system for transmitting data over a telephone line must overcome other problems which also result primarily from the difference in quality of the transmission lines. A most significant problem has been the considerable delay and attenuation distortion of the transmitted signal by the telephone line. Due to this distortion, signal components at certain frequencies within the audio passband are delayed and attenuated to a greater extent by the telephone lines than are signal components at other frequencies. Although this delay and attenuation distortion does not significantly impair the intelligibility of voice signals, it does cause severe distortion of digital signals transmitted over these lines.

The telephone lines have also produced rapid variations in the difference between the phase of the modulation carrier of the transmitter and the phase of the demodulation carrier of the receiver. This rapid variation is commonly referred to as phase jitter. The transmission lines have also produced frequency offset wherein the whole spectrum of the transmitted signal is shifted.

The attempts of the prior art systems to solve this problem for transmission of 4800 bits per second (bps) over dial-up telephone channels have not been entirely satisfactory. For example, the prior art systems have included automatically equalized 4800 bps modems which have used, in general, either two-level partial response single sideband amplitude modulation, or four-level straight quadrature double sideband suppressed carrier amplitude modulation. These systems typically have had a bandwidth of at least 2400 Hertz for the primary channel. Telephone lines at best have a passband of 2400 Hertz so that lines of poor quality have not been capable of accommodating a spectrum of this width. As a result, the systems of the prior art generally have only been operable over the best telephone lines. Also, due to the relatively wide bandwidth of the primary channel, it has been difficult to provide the systems of the prior art with secondary channels for system control.

In the past, a number of techniques have been used to correct or equalize the transmission line distortion. In one system, the distortion of the transmission line is determined and, prior to transmission, the data is predistorted in such a way that the additional line distortion alters the transmitted signal to produce an undistorted received signal. This system is particularly tedious, and its use is clearly limited to those situations where the delay and attenuation characteristics of the line are constant and known.

Other transmission systems have been designed to manually compensate for the unknown characteristics of the transmission line at the receiver. After measurement of the line characteristics, these networks have been manually adjusted to provide additional delay and attenuation characteristics for those frequencies which experience the least delay and attenuation over the transmission line. While widely used, these equalization systems suffer a considerable disadvantage in that they have to be manually adjusted each time a change in line characteristics occurs. These adjustments are both tedious and time consuming.

Still a further technique for correcting the distortion of the transmitted signal involves the use of decision feedback equalization. In such a technique, the detected data samples are cross-correlated with the received signal to obtain samples of the impulse response of the channel. Then the previously detected data samples are multiplied with the impulse response samples and subtracted from the incoming signal to eliminate intersymbol interference. This cross-correlation, however, is only responsive to intersymbol interference which follows a signaling pulse. In general, the intersymbol interference leads as well as follows the signaling pulse, so that the decision feedback removes only a portion of the intersymbol interference. Furthermore, if an error is made in detecting the data, the erroneous data pulse is multiplied by the impulse response and, instead of subtracting the intersymbol interference, it acually adds to it. This avalanche of errors has been a significant drawback in these feedback or recursive type equalization systems.

SUMMARY OF THE INVENTION

The subject matter of the present invention includes a first data processing apparatus which provide digitized data at a particular frequency, such as 4800 bps, for transmission over a telephone line to a second data processing apparatus.

A transmitter receives the data from the first data processing apparatus, randomizes the data, and differentially encodes it into in-phase and quadrature data signals. These data signals can then be encoded into digital words expressing one of four data levels, and the channels can be lowpass-filtered to provide a baseband signal of 600 Hertz. The output signals from the lowpass filters can then be multiplied by the in-phase and quadrature outputs of a 1600 Hertz sine/cosine read only memory (ROM), and summed together to form a digitally implemented double sideband quadrature amplitude modulated (QAM) suppressed carrier signal. This signal is then fed to a digital-to-analog converter to convert from a digital signal into an analog signal, lowpass filtered to remove the sampling frequency components, and introduced to the telephone line.

A receiver which is connected to the opposite end of the telephone line receives the data signal which typically will have been distorted by the telephone line. In the receiver, the data signal, after passing through an analog bandpass filter and an automatic gain control, is sampled 4800 times per second in a sampler to convert the signal from analog to digital format. A sine/cosine ROM non-coherently demodulates the incoming signal, and two digital lowpass filters select the desired basebands for the in-phase and quadrature channels. The lowpass filters in the transmitter and the receiver can be tuned to provide (1,1) partial response signaling. After the signal is quadrature demodulated, the two quadrature channels can be equalized by a set of transversal equalizers. Each of the transversal equalizers includes a plurality of multipliers each of which sequentially multiplies the data in one of the channels by a variable multiplying coefficient. Following the equalizers is a carrier phase correction network which corrects for line frequency offset, phase offset and phase jitter.

After being phase corrected, the signal from each channel is detected, and an error signal responsive to the phase corrected signals and the detected signals is calculated. This error signal can be used to synchronize the timing of the receiver to the transmitter, and also to update the correction of the frequency offset, phase offset, and phase jitter by the carrier phase correction network. When properly correlated with the detected data, the error signals generate equalization correction signals for updating the multiplying coefficients of the transversal equalizers. After the data stream is differentially decoded, it is derandomized and sent to the associated business machine.

The use of the error signals and the detected data to form the equalization correction signals is particularly desirable for partial response signaling in an all-digital implementation. The equalization network uses the partial response detected data which are already available in the system. This provides a savings in circuitry which might otherwise be used to determine and store the sign of an unequalized signal. Since the equalization correction signals can be derived from the random data transmissions, the equalization network does not rely upon any special tones or transmission preamble. The equalization network also utilizes the majority vote of both the in-phase and quadrature channels to produce a fast, as well as an effective equalization capability. Thus the equalization network corrects for the assymetrical as well as symmetrical delay and attenuation distortion of the data signal which occurs as a result of transmission over the telephone line.

With the implementation of the double sideband quadrature amplitude modulated partial response data modem, the system can transmit 4800 bps with a passband of only 1200 Hertz. This narrow spectrum can be accommodated by over 98 percent of the dial-up telephone channels, so the system is particularly adapted for use with the dial-up telephone lines. Furthermore, the remainder of the telephone line spectrum can be used for 150 bps secondary channels both above and below the data spectrum. These secondary channels will enable the incorporation of a full duplex 150 bps frequency shift modulated secondary channel for system control.

The dial-up lines can be less expensive than the leased lines particularly when it is noted that the cost of a dial-up line is directly related to the time of use. Furthermore with the use of dial-up lines, the use is not limited to one particular destination but may, through the use of the wide-spread telephone network, reach many destinations.

The error signal provides updating information for the equalizer, timing control, and phase lock loop so that the system is capable of recovering from severe outside disturbances such as phase hits and impulse noise. The modem receiver can converge on any one of four possible carrier phase angles with respect to the carrier phase angle of the transmitter. Thus, the phase angle ambiguity can be corrected and the data recovery accomplished without transmitting a known sequence of data from the transmitter but rather by differentially encoding and decoding the data. In short, a data modem is provided which is able to learn the telephone line and to adapt itself continuously to the line, solely with the help of incoming data.

These and other features and advantages of the present invention will be more apparent with a discussion of the preferred embodiments taken in conjunction with the associated drawings.

DESCRIPTION OF THE DRAWINGS

FIG. 7 is an eye pattern of an equalized and phase corrected signal;

FIG. 8 is a block diagram of the timing control network shown in FIG. 3;

FIG. 9 is a block diagram of the decision threshold control shown in FIG. 3; and FIG. 10 is a waveform of an exemplary impulse response of the receiver illustrated in FIG. 3.

DESCRIPTION OF THE PREFERRED EMBODIMENTS

Figures 1, 2:
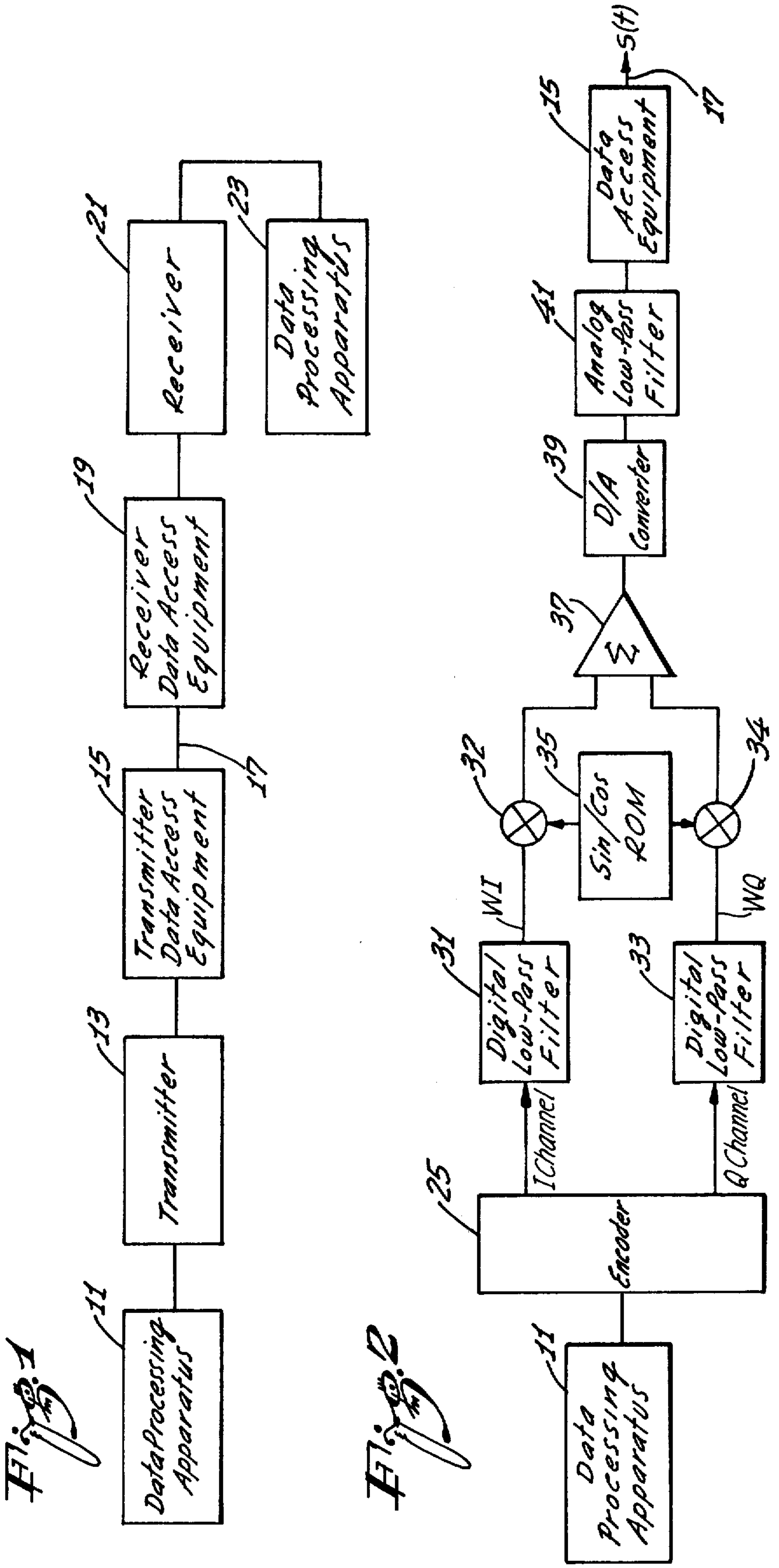
FIG. 1 is a block diagram of a data transmission system comprising a transmitter, and a receiver including one embodiment of the phase lock loop of the present invention.
FIG. 2 is a block diagram of the transmitter shown in FIG. 1.

The present invention concerns digital modems which augment the transmission of digital data between at least a pair of data processing apparatus which are disposed to communicate with each other over a telephone line. A first such data processing apparatus is shown schematically in FIG. 1 and designated by the reference numeral 11. The data from the first data processing apparatus 11 is encoded in a transmitter 13 which can be a double sideband suppressed quadrature carrier amplitude modulated transmitter. This data is then sent to data access equipment 15 which interfaces with a plurality of telephone lines, including the line 17. In a preferred embodiment, the telephone line 17 is terminated at receiver data access equipment 19 and introduced to a receiver 21 which can be a double sideband suppressed carrier quadrature amplitude modulated receiver. In the receiver 21, the incoming signal is demodulated and decoded before it is forwarded to a second data processing apparatus 23. In this manner, the data from the first data processing apparatus 11 can be transferred to the second data processing apparatus 23 over the telephone line 17.

The transmitter 13 is shown in greater detail in FIG. 2 between the first data processing apparatus 11 and the transmission data access equipment 15. An encoder 25 is connected to the data processing apparatus 11 and adapted to receive straight binary digitized data therefrom at a particular rate such as 2400 bps or 4800 bps. Within the encoder 25, incoming data is randomized, differentially encoded, and separated into an in-phase channel and a quadrature channel, which have been so designated for a reason which will be subsequently apparent. These channels will hereinafter be referred to as the I channel and the Q channel respectively.

At the output of the encoder 25, the signals in the I and Q channels respectively, can include digital words or symbols $dI_j$ and $dQ_j$, respectively, where the sub $j$ implies the $j$th data symbol. Each of the data symbols $dI_j$ and $dQ_j$ express one of a plurality of data levels, the number of which depends on the speed of the operation. For example, if data is being transmitted at a rate of 2400 bps, the digital symbols will typically express data levels of ± 1. For 4800 bps operation, the symbols will typically express one of four levels such as ± 3 and ± 1. In the latter case, the digital symbols will each contain two bits to express one of the four levels. The digital symbols will typically occur at the rate of 1200 per second so that the modem throughput is 1200 symbols per second per channel, times two bits per symbol, times two channels or 4800 bps.

Properly encoded, the input data bits at 4800 bps 2400 bps appear at the inputs to one of a pair of lowpass filters 31 and 33 as the data symbols $dI_j$ and $dQ_j$, respectively. These filters 31 and 33 can be transveral filters comprising a series of delay stages and means for sequentially multiplying each of the data symbols $dI_j$ and $dQ_j$ by a plurality of tap coefficients each of which is associated with one of the stages. The taps of the filters 31 and 33 may have fixed coefficients which in combination with similar filters in the receiver 21 are tuned to provide the system with (1,1) partial response signaling which will be discussed subsequently in greater detail. The products resulting from the multiplication are summed to provide the output of the respective filters 31 and 33. These digital signals may be expressed as follows in the respective channels 27 and 29, respectively:

$$WI_j = \sum_{-k_1}^{k_2} dI_{j+k} gI_{-k}$$

$$WQ_j = \sum_{-k_1}^{k_2} dQ_{j+k} gI_{-k} \qquad \text{Equation (1)}$$

where $gI_{-k}$ are the tap values of the digital lowpass filters 31 and 33. A particular tap might be designated $gI_o$ in which case consecutively preceding taps in the series might be designated $gI_{-1}$, $gI_{-2}$ . . . $gI_{-k_1}$. The taps consecutively following $gI_o$ might be designated $gI_1$, $gI_2$ . . . $gI_{k_2}$. This type of digital notation as well as a more detailed discussion of transversal filters and other background material relating to the present invention can be found in R. Lucky, J. Salz, and E. Weldon, *Principles of Data Communication* (McGraw-Hill, 1968).

After being appropriately filtered, the signals in the I and Q channels can then be introduced to multipliers 32 and 34, respectively, wherein they are multiplied at a carrier frequency such as 1600 Hertz by digital quantities from a sine/cosine ROM 35. For example, the signal in the I channel can be multiplied at the baud rate consecutively and repeatedly by the sine of the angles 120°, 240°, and 360°. The signal in the Q channel can be multiplied by the cosine of these angles. These modulated signals can then be combined in an adder 37, converted to analog format in a digital-to-analog converter 39, and smoothed by an analog lowpass filter 41. In its analog format, this signal transmitted on the telephone line 17 can be expressed as follows:

$$s(t) = WI_j \cos\omega_c t + WQ_j \sin\omega_c t \qquad (2)$$

where:

$WI_j$ and $WQ_j$ are the $j$th data symbols of the in-phase and quadrature components of the baseband signal; and $\omega_c$ is the radian frequency of the sine/cosine ROM 35.

The signal transmitted on the telephone line 17 may be altered to a greater or lesser extent, depending on the quality of the line 17. For example, the line 17 may cause the entire data spectrum to shift; this is typically referred to as frequency offset. A poor quality telephone line 17 may also produce phase jitter so that the carrier phase of the received signal varies in a generally sinusoidal manner with respect to the carrier phase of the transmitted signal. There may also be an initial difference between the carrier phase of the transmitter 13 and the carrier phase of the receiver 21. This is commonly referred to as phase offset.

If the telephone line 17 is of poor quality, it may also produce asymmetrical as well as symmetrical delay and attenuation distortion. This distortion is based on the treatment the telephone line 17 gives each particular frequency in the spectrum with respect to the carrier frequency. For example, some of the frequencies in the spectrum will experience a greater delay than other frequencies in the spectrum. Similarly, the telephone line 17 may attenuate some frequencies more than others. It is, of course, desirable that the receiver 21 be able to compensate for all of these undesirable characteristics of the telephone line 17 in order to minimize the error between the signal received and the signal transmitted.

The receiver 21, which is shown in greater detail in the block diagram illustrated in FIG. 3, will be discussed generally before a detailed description of its elements is undertaken.

Figures 3, 3A, 4:
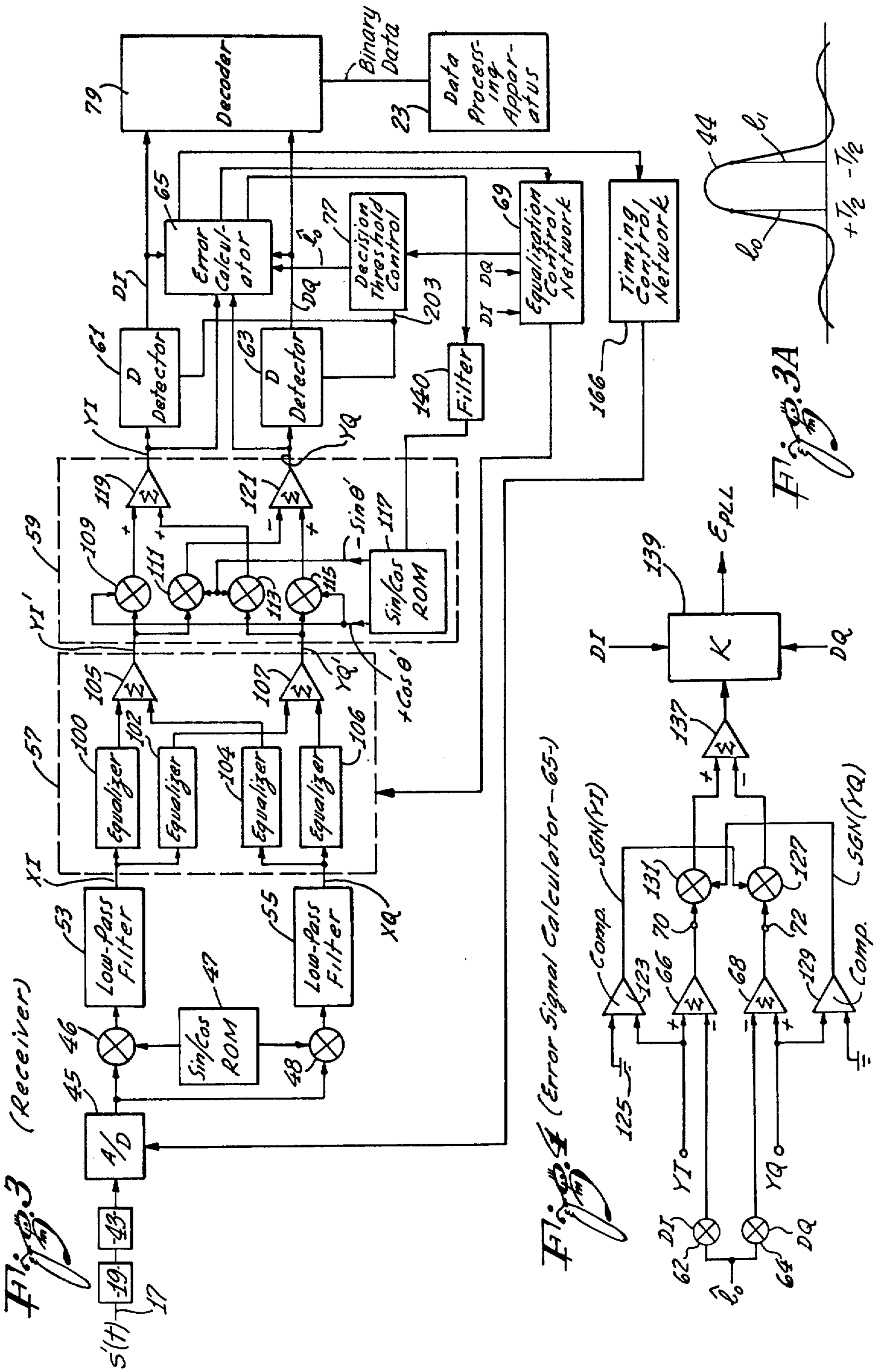
FIG. 3 is a block diagram of the receiver shown in FIG. 1, including an equalization network, an embodiment of the phase lock loop of the present invention, an error signal calculator, a timing control network, and a decision threshold control.
FIG. 3A is a waveform showing an impulse response of the embodiment of the receiver illustrated in FIG. 3.
FIG. 4 is a block diagram of the error signal calculator shown in FIG. 3.

To emphasize the distorted characteristics of the transmitted signal, the signal input to the receiver 21 in FIG. 3 is designated $s'(t)$. This signal $s'(t)$ is substantially the transmitted signal $s(t)$ plus all channel distortion. In addition to the phase and frequency offset, and phase jitter, this channel distortion will include gaussian and impulse noise.

$$s'(t) = \left\{WI_j \cos\left[\omega_c t + \phi(t)\right] + WQ_j \sin\left[\omega_c t + \phi(t)\right]\right\} * c(t) + n(t) \qquad (2A)$$

where $\phi(t)$ is the phase error produced by the line;

$n(t)$ is the line noise, both gaussian and impulse;

* is convolution integral; and $c(t)$ is the channel impulse response, a function of attenuation and delay distortions.

The input analog signal $s'(t)$ from the telephone line 17 is introduced through a data access equipment 19 to an analog bandpass filter and automatic gain control 43 which selects the desired passband and signal level. An analog-to-digital converter or sampler 45 is provided to sample the incoming analog signal at a rate, such as 4800 times per second, corresponding to some multiple of the symbol rate of the transmitter 13.

Following the sampler 45 and throughout the remainder of the receiver 21 all signals will have a digital format.

The digital signal from the sampler 45 can be separately multiplied in each of a pair of multipliers 46 and 48 by a sine/cosine ROM 47. In this manner, the signal can be non-coherently demodulated and separated into an in-phase channel and a quadrature channel, which will also be referred to throughout the receiver 21 as the I channel and the Q channel respectively.

From the multipliers 46 and 48, the signals in the I and Q channels can be introduced to respective digital lowpass filters 53 and 55 to select and to shape the baseband from the demodulated signals. It is the filters 53 and 55 in the receiver 21 which were previously referred to as being tuned with the filters 31 and 33 in the transmitter 13 to provide the (1,1) partial response signaling which will be explained in greater detail below.

Ideally the (1,1) partial response signaling provides a seven-level signal at the output of each of the lowpass filters 53 and 55. In terms of the input data symbols $dI_j$ and $dQ_j$ these seven level partial response signals, which will be designated $DI_j$ and $DQ_j$, can be expressed as follows:

$$DI_j = dI_j + dI_{j-1}$$
$$DQ_j = dQ_j + dQ_{j-1} \qquad (3)$$

where for 4800 bps operation $dI_j$ and $dQ_j$ can be represented by ±1 or ±3. If the signals from the filter 53 were ideal, the seven-level signals $DI_j$ and $DQ_j$ could be detected at this point and decoded, in a manner described below, to provide the binary data transmitted.

It is a primary purpose of the receiver 21 to correct for phase error and channel distortion so that the seven-level symbols $DI_j$ and $DQ_j$ can be detected to reproduce the transmitted data. Since the signals at the outputs of the lowpass filters 53 and 55 will typically not be ideal but will rather be polluted by channel distortion, phase error, and other forms of noise, they will be designated by the notation XI and XQ. In terms of the incoming signal $s'(t)$ these pre-equalized signals can be expressed as follows:

$$XI = [s'(t) \cos\omega_c t] * gI(t)$$
$$XQ = [s'(t) \sin\omega_c t] * gI(t) \qquad (3A)$$

where:

* is convolution integral; and $gI(t)$ is the response of the filter 53 or the filter 55.

Following the filters 53 and 55, these two baseband signals XI and XQ in the I and Q channels respectively are introduced to an equalization network 57. Such a network 57 may contain a pair of transversal equalizers 100 and 102 for the I channel and a pair of transversal equalizers 104 and 106 for the Q channel. This network 57 corrects for the asymmetrical as well as the symmetrical delay and attenuation distortion of the telephone line 17. At the output of the equalization network 57, the signals in the I and Q channels, which will be designated YI′ and YQ′ respectively, can be expressed as follows:

$$YI'_j = \sum_n CI_n XI_{j-n} - \sum_n CQ_n XQ_{j-n}$$
$$YQ'_j = \sum_n CI_n XQ_{j-n} + \sum_n CQ_n XI_{j-n} \qquad (4)$$

where:

$CI$ and $CQ$ are equalizer multiplying coefficients in the respective channels, and $n$ signifies the maximum number of multipliers in the equalizers 100, 102, 104, and 106.

In the phase correction network 59 the equalized signals YI′ and YQ′ are multiplied by sine and cosine values of a phase angle $\phi'$ which is generated in the network 59 and is dependent on the phase error $\phi$. At the output of the phase correction network 59, the equalized and phase corrected signals, which will be designated YI and YQ in respective I and Q channels, can be expressed as follows:

$$YI_j = YI'_j \cos\phi' - YQ_j' \sin\phi'$$

$$YQ_j = YQ'_j \cos\phi' + YI_j' \sin\phi' \quad (5)$$

At the output of the phase correction network 59, the signals YI and YQ have been equalized and phase corrected. Thus, most of the distortion which prevented the pre-equalizer signals XI and XQ from geing ideal, has been removed. It follows that the signals YI and YQ are substantially the ideal seven-level symbols DI and DQ. These signals YI and YQ, can be introduced to detectors 61 and 63 in the respective I and Q channels. The detectors 61 and 63 are threshold detectors which determine which of the seven possible levels the $YI_j$ and $YQ_j$ signals most closely approximate. The seven-level symbols $DI_j$ and $DQ_j$ are then provided at the output of the respective detectors 61 and 63. A decoder 79 decodes the seven-level symbols DI and DQ to provide the four-level symbols $dI_j$ and $dQ_j$ in accordance with the following equation:

$$dI_j = DI_j - dI_{j-1}$$

(Previously) designated Equation 3)

$$dQ_j = DQ_j - dQ_{j-1}$$

The decoder 79 also decodes the four-level symbols $dI_j$ and $dQ_j$ to provide the binary data which is introduced to the second data processing apparatus 23.

In the preferred embodiment, the error calculator 65 provides an error signal for updating the sampling rate of the sampler 45, the equalization of the network 57, and the phase correction of the network 59. It is of particular importance that, with the provision of a single error calculator 65 which relies solely upon incoming data, the timing, equalization, and phase correction of the receiver 21 can be corrected to compensate for the deficiencies of the incoming signal. With the correction of these characteristics, the detected data from the detectors 61 and 63 can be introduced to a decoder 79 wherein the signals are differentially decoded, derandomized, and introduced to the second data processing apparatus 23.

Preliminary to a detailed discussion of this system in general, it may be of advantage to summarize the notation set forth above, to discuss (1,1) partial response signaling, and to derive the system error signals which can be used to update the system corrections.

As set forth above the following notation will be used throughout the remainder of the detailed description to designate the quantities indicated:

XI = the pre-equalized signal in the I channel;

XQ = the pre-equalized signal in the Q channel;

YI' = the equalized signal in the I channel preceding the phase correction network 59;

YQ' = the equalized signal in the Q channel preceding the phase correction network 59;

YI = the equalized and phase corrected signal in the I channel;

YQ = the equalized and phase corrected signal in the Q channel;

DI = the data symbol provided at the output of the detector 61; and

DQ = the data symbol provided at the output of the detector 63.

To further facilitate a detailed discussion of the system, it is helpful to be somewhat familiar with partial response signaling. A waveform illustrating a typical impulse response is shown generally in FIG. 3A and designated by the reference numeral 44. The sampling of the waveform 44 by the sampler 45 can be such that the first sample valued, typically designated $l_o$, is taken on the leading edge of the impulse response at a time + T/2. The second sample value, typically designated $l_1$, is taken on the trailing edge of the impulse response at a time −T/2 where T is the symbol period. In this type of partial response signaling, $l_o$ equals $l_1$, and both of these sampled values are normalized to unity. With these characteristics, this type of signaling is commonly referred to as (1,1) partial response signaling.

Using the above summarized notation, it will now be shown how error signals can be derived from the data present in the receiver 21. A portion of the error calculator 65 is illustrated in FIG. 4 wherein it will be noted that the DI and DQ signals from the detectors 61 and 63 are introduced to a pair of multipliers 62 and 64, respectively. Also introduced to the multipliers 62 and 64 is a quantity $\hat{l}_o$ which is generated by a decision threshold control 77 to be discussed subsequently. This quantity $\hat{l}_o$ is an updated estimate of the first sampled value of an impulse response sampled in accordance with (1,1) partial response signaling which value is commonly designated $\hat{l}_o$.

From the multipliers 62 and 64, the signals DI $\hat{l}_o$ and DQ $\hat{l}_o$ are respectively introduced to the negative terminals of a pair of differential adders 66 and 68. The equalized signals YI and YQ are introduced to the positive terminals so at the outputs of the adders 66 and 68, the following error signals are provided for the I channel and the Q channel, respectively:

$$EI = YI - DI\,\hat{l}_o \quad (6)$$
$$EQ = YQ - DQ\,\hat{l}_o$$

In the error calculator 65, these error signals appear at a pair of terminals 70 and 72, respectively.

Having established a standard notation, discussed partial response signaling, and derived the error signals EI and EQ, the operation of the receiver 21 will now be described in greater detail. As previously noted with reference to FIG. 3, the signal received by the sampler 45 is an analog signal which is substantially the signal transmitted by the transmitter 13, but which has typically been garbled by the imperfections of the telephone line 17. This incoming signal may be expressed as follows:

$$s'(t) = \left\{ WI_j \cos[\omega_c t + \phi(t)] + WQ_j \sin[\omega_c t + \phi(t)] \right\} * c(t) + n(t)$$ (previously designated Equation 2A)

In the sampler 45, this signal $s'(t)$ preferably is sampled at a rate, such as 4800 times per second, corresponding to a multiple of the symbol rate of the transmitter 13. The sampler 45 can be responsive to plus or minus 512 discrete levels and the information taken at each sample can be expressed in a 10-bit digital word. This digital signal can then be introduced to the pair of multipliers 46 and 48.

In the multipliers 46 and 48, these digital signals are multiplied by quantities received from a sine/cosine ROM 47 having a carrier frequency, such as 1600 Hertz, substantially equal to the frequency of the sine/cosine ROM 35 in the transmitter 13. For example in the multiplier 46, the digital information can be sequentially multiplied at the sampler rate of 4800 times per second by the sine of the angles 120°, 240°, and 360°. Similarly in the multiplier 48, the digitial information can be multiplied at the sampler rate of 4800 times per second by the cosine of the angles 120°, 240°, and 360°. It will be noted that, although the carrier frequencies of the ROM 35 and ROM 47 may be equal, the phase relationships of the carriers may not be equal in which case the signal is said to be non-coherently demodulated.

The 1600 Hertz carrier frequency is particularly desirable because it places the data passband of 1200 Hertz between 1000 Hertz and 2200 Hertz in the telephone line passband. This leaves sufficient passband to accommodate a 150 Hertz secondary control channel both above and below the data passband. The 1600 Hertz carrier is also desirable because it is one-third the sampling frequency of 4800 bps. Thus, sine and cosine values of three equally spaced angles 120°, 240°, and 360°, can provide the multiplying quantities for demodulation. The sines of these angles are 0.866, −0.866, and zero; while the cosine of these angles are −0.5, −0.5, and 1. It follows that the 1600 Hertz frequency enables the ROMS 35 and 47 to function by merely storing the digital quantities of 0.5 and 0.866. Appropriate sign changes of these values provide the multiplying quantities desired.

When the incoming signal is demodulated in the foregoing manner, sine squared terms, cosine squared terms, and sine/cosine terms may be produced, each of which has undesirable components of frequency twice that of the carrier frequency of the ROM 47. For this reason, the resulting products in the I and Q channels are introduced into the digital lowpass filters 53 and 55, respectively, wherein the double frequency terms are eliminated.

The filters 53 and 55 are transversal filters of the type described with reference to the filters 31 and 33 in the transmitter 13. Thus they typically consist of a series of delay stages each sequentially receiving the digital samples and each multiplying the samples by one of a plurality of coefficients. The resulting products can be added at the rate of 1200 times per second and the sum rounded off to 12-bit digital words.

For symbols transmitted at the ideal Nyquist rate of $2\omega$ symbols per second over an ideal channel having a bandwidth of $\omega$ Hertz, the filters 33, 35 and 53, 55 can be tuned to provide composite signal shaping characteristics of $$H\ (\omega) = 2\ T\cos\frac{T\omega}{2}$$

$$\text{for}\quad (\omega) \leqq \frac{\pi}{T}$$

$$\text{and}\quad H\ (\omega) = 0$$

$$\text{for}\quad (\omega) > \frac{\pi}{T}$$

where $T$ is the symbol period.

In the absence of channel distortion, this provides the overall system with an impulse response of $$h(t) = \frac{4}{\pi}\left[\frac{\cos(\pi t/T)}{1-4t^2/T^2}\right]$$

which can be shown to be unity for $t = \pm T/2$ and zero for all other sampling times. Thus a sample $l_o$ taken at the time $+T/2$ and a sample $l_1$ taken at the time $-T/2$ both have an impulse response of unity.

This type of signaling, which is commonly referred to as (1,1) partial response signaling, is particularly desirable in the present invention since it permits the seven-level symbols $DI_j$, $DQ_j$ to be expressed in terms of the four level data symbols $dI_j$ and $dQ_j$ as shown in Equation 3. It follows that the only intersymbol interference present in the seven-level symbols $DI_j$ and $DQ_j$ is that associated with the preceding four-level symbol $dI_{j-1}$ and $dQ_{j-1}$. This relationship facilitates decoding of the seven-level symbols in the manner previously discussed. This permits decoding of the data by substracting the preceding symbol $d_{j-1}$ from the present $D_j$ to determine the present symbol $d_j$.

Partial response signaling is particularly desirable since it provides a practical method for transmitting data at the Nyquist rate of $2\omega$ symbols per second over a channel having a width of $\omega$ Hertz. In the present invention, it permits 1200 symbols per second to be transmitted through a baseband of only 600 Hertz. When this signal is modulated on a carrier, it becomes a 1200 Hertz passband signal.

At the input of the equalization network 57, the signals in the respective I and Q channels can be expressed in terms of the data symbols $dI$ and $dQ$ as follows:

$$\begin{aligned} XI_j &= \sum_i dI_{j+i}\, hI_{-i} + \sum_i dQ_{j+i}\, hQ_{-i} \\ XQ_j &= \sum_i dQ_{j+i}\, hI_{-i} - \sum_i dI_{j+i}\, hQ_{-i} \end{aligned} \qquad (7)$$

where:

- $hI$ and $hQ$ are the sample values of the equivalent baseband in-phase and quadrature impulse response characteristics of the I and Q channels resulting from filter shaping and channel distortion; and
- sub $i$ signifies the maximum number of significant terms of the hI and hQ impulse response characteristics.

Since the input data symbols $dI_j$ can be expressed in terms of the partial response data symbols $DI_j$ as shown by Equation 3, it is apparent that the preequalizer signals XI and XQ can also be expressed in terms of partial response data signals $DI_j$ and $DQ_j$ as follows:

$$\begin{aligned} XI_j &= \sum_i DI_{j+i}\, pI_{-i} + \sum_i DQ_{j+i}\, pQ_{-i} \\ XQ_j &= \sum_i DQ_{j+i}\, pI_{-i} - \sum_i DI_{j+i}\, PQ_{-i} \end{aligned} \qquad (8)$$

It can be seen from the similarity of Equations 7 and 8 that the $h$ values correspond to the response $h\ (t)$ of the receiver 21 to an impulse in the $s\ (t)'$ signal which provides the symbols $dI_j$ and $dQ_j$. In contrast, the $p$ values in Equation 8 correspond to a response $p\ (t)$ to an impulse in a theoretical signal providing the symbols $DI_j$ and $DQ_j$. Since no such theoretical signal actually exists in the receiver 21, these $p$ values are purely hypothetical and do not directly relate to the quantities in the receiver 21.

If the partial response data symbols DI and DQ can be expressed in terms of the input data symbols $dI$ and $dQ$, as shown in Equation 3, it follows that the impulse response $p$ values can also be expressed in terms of the impulse response $h$ values:

$$pI_{-i_1} = hI_{-i_1}$$

$$pI_{-i_1+1} = hI_{-i_1+1} - pI_{-i_1}$$

and, in general, $pI_{-i_1+1} = hI_{-i_1+1} - pI_{-i_1+i-1}$ similarly, in general, $pQ_{-i_1} = hQ_{-i_1}$ $pQ_{-i_1+i} = hQ_{-i_1+i} - pQ_{-i_1+i-1}$ Since the $XI_j$ and $XQ_j$ signals at the input to the equalization network 57 can be expressed in terms of the input data symbols $dI_j$ and $dQ_j$ (Equation 7), it follows that they $YI_j'$ and $YQ_j'$ signals can also be expressed in terms of these quantities:

$$YI'_j = \sum_k dI_{j+k}\, lI_k + \sum_k dQ_{j+k}\, lQ_k$$
$$YQ'_j = \sum_k dQ_{j+k}\, lI_k - \sum_k dQ_{j+k}\, lQ_k \qquad (10)$$

where:

$lI$ and $lQ$ are the sample values of the equivalent baseband in-phase and quadrature impulse response characteristics of the I and Q channels resulting from not only filter shaping and channel distortion but also equalization; and sub $k$ signifies the maximum number of significant terms of the $lI$ and $lQ$ sample values.

If equalization is considered, Equation 10 can also be rewritten in terms of the data symbols $DI_j$ and $DQ_j$ and samples of a theoretical impulse response $m(t)$. Thus the equalized signals can also be expressed as:

$$YI'_j = \sum_i DI_{j+i}\, mI_i - \sum_i DQ_{j+i}\, mQ_i$$
$$YQ'_j = \sum_i DQ_{j+i}\, mI_i + \sum_i DI_{j+i}\, mQ_{-i} \qquad (11)$$

where:

$mI$ and $mQ$ are the sample values of the equivalent baseband in-phase and quadrature impulse response characteristics of the I and Q channels resulting from not only filter shaping and channel distortion but also equalization; and $i$ signifies the maximum number of significant terms of the $mI$ and $mQ$ sample values.

It can be seen from the similarity of Equations 10 and 11 that the $m$ values correspond to a response to an impulse in a theoretical signal providing the partial response symbols $DI_j$ and $DQ_j$.

As was the case with the $h$ values and $p$ values it can also be shown that the $m$ values and $l$ values have in general the following relationship:

$$mI_{-i_1+i} = lI_{-i_1+i} - mI_{-i_1+i-1} \qquad (12)$$
$$mQ_{-i_1+i} = lQ_{-i_1+i} - mQ_{-i_1+i-1}$$

Figure 5:
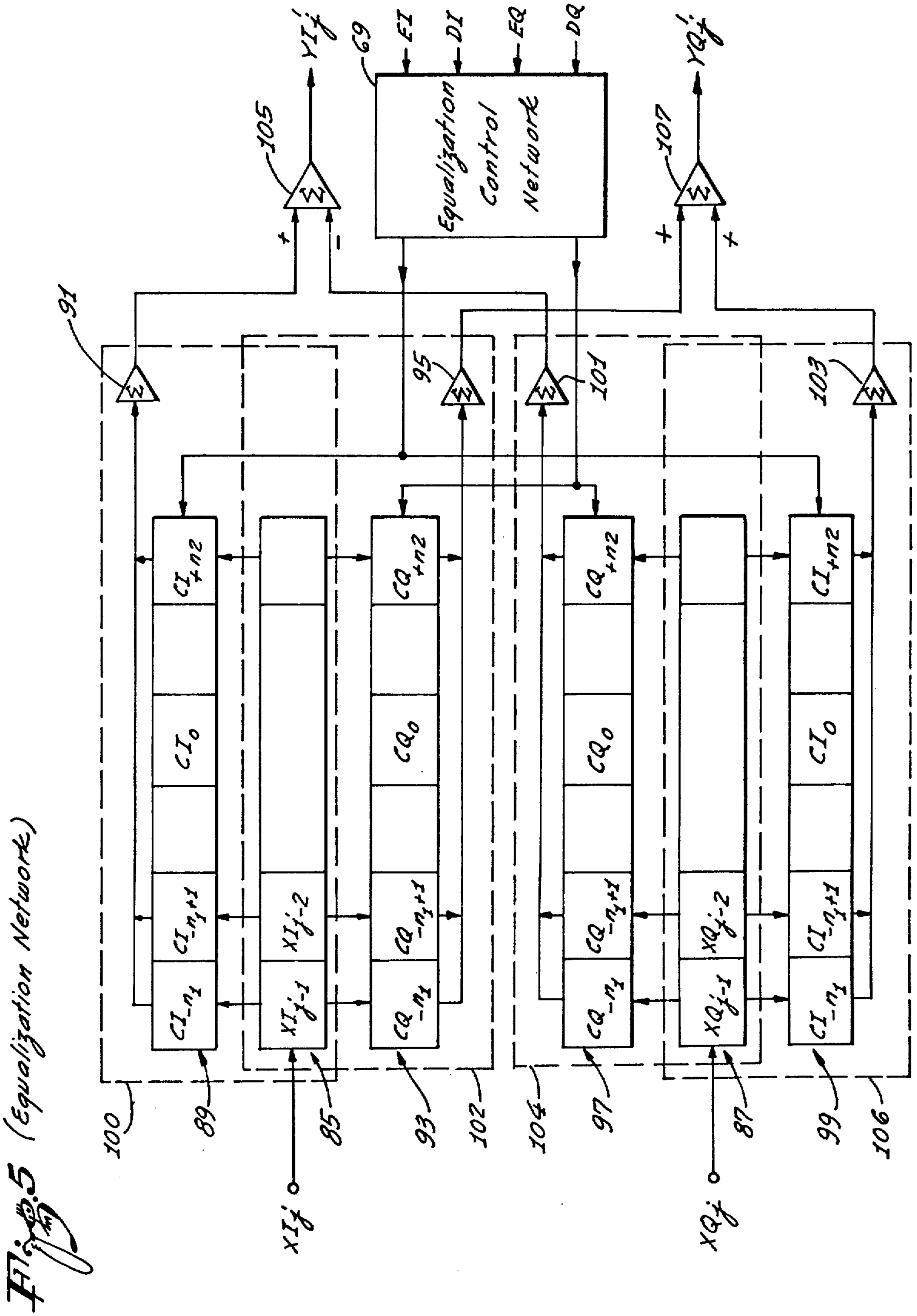
FIG. 5 is a block diagram of the equalization network shown in FIG. 3.

Referring now to FIG. 5, it will be noted that the transversal equalizers 100, 102, 104, and 106 are similar to the transversal filters 53 and 55 except the multiplying coefficients are variable. Thus, the equalization network 57 can include a series of storage registers 85 and 87 for the respective I and Q channels. At the rate of 1200 times per second, the 12-bit words in the $XI_j$ signal can be sequentially introduced into the registers 85, and the 12-bit words in the $XQ_j$ signal can be sequentially introduced into the registers 87. A series of in-phase multipliers 89 are provided to individually multiply each of the words in the registers 85 by a variable multiplying coefficient $CI_n$. The resulting in-phase products are introduced to an adder 91. Similarly, each of the registers 85 is connected to one of a series of quadrature multipliers 93, wherein the words of the $XI_j$ signal are individually multiplied by a variable multiplying coefficient $CQ_n$. These quadrature products are introduced to an adder 95.

Each of the series of registers 87 is connected to one of a series of in-phase multipliers 99 and one of a series of quadrature multipliers 97. Each of the in-phase multipliers 99 has a respective multiplying coefficient $CI_n$. Similarly each of the quadrature multipliers 97 has a respective multiplying coefficient $CQ_n$. The symbols in the registers 87 are multiplied by the coefficients $CQ_n$ and $CI_n$ in the multipliers 97 and 99 respectively to produce quadrature products and in-phase products which are respectively introduced to a pair of adders 101 and 103.

A differential adder 105 combines the quantities from the adders 91 and 101 to provide the signal $YI'_j$ at the output of the equalization network 57. In an adder 107, the signals from the adders 95 and 103 are combined to provide the $YQ'_j$ signal at the output of the equalization network 57. These output signals of the equalization network 57 can be expressed as a function of the input signals $XI_j$ and $XQ_j$, and the in-phase and quadrature equalizer multiplying coefficients $CI_n$ (89 and 99) and $CQ_n$ (93 and 97), respectively, as follows:

$$YI'_j = \sum_n CI_n XI_{j-n} - \sum_n CQ_n XQ_{j-n}$$
$$YQ'_j = \sum_n CI_n XQ_{j-n} + \sum_n CQ_n XI_{j-n} \qquad \text{(previously designated Equation 4)}$$

where $n$ signifies the number of multiplying coefficients in each of the multipliers 89, 93, 97, and 99.

Since the $XI_j$ and $XQ_j$ signals can be expressed in terms of the h values (Equation 7), and the $YI_j$ and $YQ_j$ signals can be expressed in terms of the $l$ values (Equation 10), it follows from Equation 4 that the $h$ values and the $l$ values are related by the multiplying coefficients CI and CQ:

$$lI_k = \sum_n CI_n hI_{k-n} - \sum_n CQ_n hQ_{k-n}$$
$$lQ_k = \sum_n CI_n hQ_{k-n} + \sum_n CQ_n hI_{k-n} \qquad (12a)$$

where $k$ signifies the number of multiplying coefficients in each of the multipliers 89, 93, 97, and 99.

It also follows that the sample values of the impulse response characteristics $m(t)$ and $p(t)$ are similarly related by the multiplying coefficients CI and CQ:

$$mI_k = \sum_n CI_n pI_{k-n} - \sum_n CQ_n pQ_{k-n}$$
$$mQ_k = \sum_n CI_n pQ_{k-n} + \sum_n CQ_n pI_{k-n}$$

where $k$ is as previously defined.

It will now be recalled that ideally $YI'_j = DI_j$ and $YQ'_j = DQ_j$. This desirable result is achieved if all values of $mQ_{-k}$ in Equation 11 are reduced to zero so that the DQ terms resulting from interchannel interference are removed from the $YI'_j$ signal; and all DI terms, other than $DI_j$, resulting from intersymbol interference are removed from the $YI'_j$ signal. In other words, $YI'_j = DI_j$ if:

$$mI_{-k} = \begin{cases} 1 \text{ for } k = 0 \\ 0 \text{ otherwise} \end{cases}$$

and $$mQ_{-k} = 0 \text{ for all } k$$

Under these conditions, $$mI_o = lI_o = l_o$$

and Equation 11 reduces to the desired result for $l_o$ normalized to one:

$$YI'_j = DI_j$$

A similar analysis can be made for the quadrature channel to show that ideally $$YQ'_j = DQ_j$$

Notice that with this result, the equalization network 57 has eliminated all intersymbol interference due to symmetrical attenuation and delay distortion, as shown by $mI_{-k} = 1$ for $k = 0$, and $mI_{-k} = 0$ otherwise. It has also eliminated all intersymbol interference due to asymmetrical attenuation and delay distortion as shown by $mQ_{-k} = 0$ for all $k$.

If there is no phase error, the signals YI and YQ will equal the signals YI' and YQ' respectively. It follows that for a perfectly equalized and phase corrected signal, $YI_j = DI_j l_o$ and $YQ_j = DQ_j l_o$. Any deviation from this ideal signal represents system error, and the error signals EI and EQ which have been previously derived, can be generated accordingly:

$EI_j = YI_j - DI_j \hat{l}_o$ (Previously designated Equation 6)

$EQ_j = YQ_j - DQ_j \hat{l}_o$ where it will be recalled $\hat{l}_o$ is an estimator of $l_o$ provided by the decision threshold control 77.

Then, to adjust the equalizer multiplying coefficients $CI_n$ and $CQ_n$, these error terms can be cross-correlated with the appropriate detected partial responsive signals $DI_{j-n}$ and $DQ_{j-n}$ where $n$ is less than or equal to the maximum number of multipliers to minimize the intersymbol interference. For example, referring to FIG. 5, in order to adjust the multiplying coefficient $CI_{-n_1}$, the error signals $EI_j$ and $EQ_j$ can be delayed by $n_1$ symbols so that $CI_{-n_1}$ is controlled by the cross-correlation of signals dependent upon the following terms:

$(EI_{j-n_1})$ and $(DI_j)$ $(EQ_{j-n_1})$ and $(DQ_j)$

Similarly, the multiplying coefficient $CI_{-n_1+1}$ can be controlled by signals dependent upon the terms:

$(EI_{j-n_1})$ and $(DI_{j-1})$ $(EQ_{j-n_1})$ and $(DQ_{j-1})$ and, in general, the multiplying coefficient $CI_{-n_1+n}$ can be controlled by signals dependent upon the terms $(EI_{j-n_1})$ and $(DI_{j-n})$ $(EQ_{j-n_1})$ and $(DQ_{j-n})$ where $-n_1 < n < n_2$.

Also, the multiplying coefficient $CQ_{-n_1+n}$ can be controlled, in general, by signals dependent upon the terms $(EI_{j-n_1})$ and $(DQ_{j-n})$ $(EQ_{j-n_1})$ and $(DI_{j-n})$ For a particular implementation of these EI, EQ, DI and DQ terms, these signals for controlling the coefficients can be defined as follows:

$$E_1(n) = SGN(EI_{j-n_1}) \ X \ SGN'(DI_{j-n_1-n})$$
$$E_2(n) = SGN(EQ_{j-n_1}) \ X \ SGN'(DQ_{j-n_1-n}) \quad (12c)$$
$$E_3(n) = SGN(EQ_{j-n_1}) \ X \ SGN'(DI_{j-n_1-n})$$
$$E_4(n) = SGN(EI_{j-n_1}) \ X \ SGN'(DQ_{j-n_1-n})$$

where $SGN$ is the sign of the term in parentheses; and $SGN'(x) = SGN(x)$ for any $x$ quantity $\neq 0$.

$SGN'(x) = 0$ for any $x$ quantity $= 0$.

For a digitally implemented equalizer, each multiplying coefficient $CI_n$ and $CQ_n$ is a digital number (typically a 12-bit coefficient) that can be incremented or decremented one or more steps each symbol. Typically, a 12-bit coefficient has 2 raised to the 12th power, or 4096 total steps, or 2048 positive and 2048 negative steps. Then all $CI_n$ for $(-n_1 < n < n_2)$ except $CI_o$, which is set at the maximum possible value adjusted as follows:

| $E_1(n)$ | $E_2(n)$ | $CI_n$ (Steps) Incremented | Decremented |
|---|---|---|---|
| + | + | | 2 |
| + | 0 | | 1 |
| + | − | | |
| 0 | + | | 1 |
| 0 | 0 | | |
| 0 | − | 1 | |
| − | + | | |
| − | 0 | 1 | |
| − | − | 2 | |

Also, all $CQ_n$ for $(-n_1 < n < n_2)$ except $CQ_o$ which is set at 0 can be adjusted as follows:

| $E_3(n)$ | $E_4(n)$ | $CQ_n$ (Steps) Incremented | Decremented |
|---|---|---|---|
| + | + | | |
| + | 0 | | 1 |
| + | − | | 2 |
| 0 | + | 1 | |
| 0 | 0 | | |
| 0 | − | | 1 |
| − | + | 2 | |
| − | 0 | 1 | |
| − | − | | |

The signals $E_1$, $E_2$, $E_3$, and $E_4$ can be derived in an equalization control network 69 which is connected to receive inputs of DI, DQ, EI, and EQ from the error calculator 65. The functions $E_1$ and $E_2$ can be correlated to step the coefficients of the in-phase multipliers 89 and 99, as shown in FIG. 5. Similarly, the functions $E_3$ and $E_4$ can be correlated to step the coefficients of the quadrature multipliers 93 and 97 in accordance with the preceding tables.

Thus it has been shown that the multiplying coefficients CI and CQ can be adjusted using the error terms $E_1$, $E_2$, $E_3$, and $E_4$. Furthermore, the specific error terms disclosed change the multiplying coefficients CI and CQ, and hence the sample values mI and mQ, such that the following ideal result is approached:

$$mI_{-k} = \begin{cases} 1 \text{ for } k = 0 \\ 0 \text{ otherwise} \end{cases}$$

and $$mQ_{-k} = 0 \text{ for all } k$$

This eliminates all intersymbol interference due to asymmetrical and symmetrical delay and attenuation distortion in the manner previously discussed.

It should be noted that $E_1$ and $E_2$ are both functions which relate to symmetrical distortion while $E_3$ and $E_4$ are both functions which relate to asymmetrical distortion. Either one of the functions could be used to correct for the associated type of distortion. However, it should be noted that each of the functions $E_1$, $E_2$, $E_3$, and $E_4$ is derived from information which is independent of the other functions. Therefore, the use of two independent functions to indicate a particular type of distortion can be used to emphasize the accuracy of the error determination and the magnitude of the connection. For example, referring to the preceding tables, it will be noted that if $E_1$ and $E_2$ have like signs, it will indicate that they both sense error in the same direction. Under these conditions, the $CI_n$ tap can be adjusted in more that one step, such as a pair of steps. Similarly, if $E_3$ and $E_4$ have opposite signs, it may be desirable to adjust the $CQ_n$ taps in more than one step.

Other equalization error terms having values proportioned to the magnitude of the EI and EQ signals could also be derived to facilitate proportional adjustment of the equalizer multiplying coefficients. Such error terms are considered to be obvious to one of ordinary skill in the art.

It may be helpful at this point to discuss a specific example of the equalization of one data signal, such as the signal $X_j$, in one channel, such as the in-phase channel. In this example it will be assumed that the transversal equalizer, such as the equalizer 100, has three multiplying coefficients, $C_{-n}$, $C_0$, and $C_n$ which initially have a value of zero. It might also be assumed that the input signal $d_j$ is a bipolar data signal of value ± 1 and rate 1/T. With these assumptions, the sample values $h_k$ of the impulse response $h(t)$ of the overall channel, can be expressed at intervals of T as follows:

$$h_k = \sum_k h(t)\,\delta(t - kT)$$

where $k$ is limited to those values which represent the most significant terms of the channel impulse response. More specifically, these terms can be designated $h_{-1}$, $h_0$, $h_1$, and $h_2$.

In a system implemented to provide (1,1) partial response signaling, an ideal channel would provide impulse response sample values $h_0$ and $h_1$ equal to $l_o$ and $l_1$, respectively, which are normalized to unity. The sample values $h_{-1}$ and $h_2$ would be zero. A more realistic example of the impulse response $h(t)$ might be shaped as indicated in FIG. 10 wherein the sample values $h_{-1}$, $h_0$, $h_1$, and $h_2$ have the values 0.2, 1.2, 0.8, and −0.2, respectively.

With a realistic example of the impulse response to the channel 27 defined, the signal at the input to the equalizer 100 can be expressed as the convolution of the input data $d_j$ and the impulse response $h(t)$ sample values of the channel as shown by Equation 7:

$$X_j = \sum_k d_{j-k}\, h_k$$

where $k$ is as previously defined.

For the sample values $h_k$ given in the example, $X_j$ can be expressed as:

$$X_j = d_{j+1}h_{-1} + d_j\, h_0 + d_{j-1}h_1 + d_{j-2}\, h_2$$
$$= d_{j+1}\,(0.2) + d_j\,(1.2) + d_{j-1}\,(0.8) + d_{j-2}\,(-0.2)$$

However, in equalizing a partial response signal to obtain the desired (1,1) signal output, it is desirable to analyze the signal $X_j$ in terms of the detected partial response signals $D_j$, as shown by Equation 8, the data signal $X_j$ at these sequential baud intervals can be expressed as:

$$X_{j+1} = D_{j+2}p_{-1} + D_{j+1}p_0 + D_jp_1$$
$$X_j = D_{j+1}p_{-1} + D_j\, p_0 + D_{j-1}\, p_1$$
$$X_{j-1} = D_j\, p_{-1} + D_{j-1}\, p_0 + D_{j-2}p_1$$

where, as shown by Equation 9, $$p_{-1} = h_{-1}$$
$$p_0 = h_0 - p_{-1}$$
$$p_1 = h_1 - p_0 = h_2$$

and for the particular sample values given in the example, $$p_{-1} = 0.2$$
$$p_0 = 1.2 - 0.2 = 1.0 \text{ and}$$
$$p_1 = 0.8 - 1.0 = -0.2$$

As noted, the equalizer 100 in this example can consist of a tapped delay line having tap coefficients $C_{-n}$, $C_o$, and $C_n$. In a manner previously described, the tap coefficients can simultaneously and individually multiply respective data signals in the delay line to provide an equalized signal $Y_j'$. Thus, as shown by Equation 4:

$$Y_j' = C_{-1}\, X_{j+1} + C_0\, X_j + C_1\, X_{j-1}$$

The correct values of $C_{-1}$ and $C_1$ ($C_0$ is usually normalized to 1.0) depend upon the impulse response of the input signal. In more detail, three sequential data signals can be expressed as follows:

$$X_{j+1} = D_{j+2}\, p_{-1} + D_{j+1}\, p_0 + D_jp_1$$
$$X_j = D_{j+1}\, p_{-1} + D_j\, p_0 + D_{j-1}p_1$$
$$X_{j-1} = D_j\, p_{-1} + D_{j-1}p_0 + D_{j-2}\, p_1$$

With appropriate substitution in the three sequential data signals above, $Y_j'$ can be expressed as follows:

$$Y'_j = C_{-1}\,(D_{j+2}\, p_{-1}) + C_{-1}\,(D_{j+1}p_0) + C_{-1}\,(D_jp_1) + C_0\,(D_{j-1}p_{-1}) + C_0\,(D_jp_0) + C_0\,(D_{j-1}p_1) + C_1\,(D_j\, p_{-1}) + C_1\,(D_{j-1}p_0) + C_1\,(D_{j-2}p_1)$$

Rearranging and combining terms, it can be shown that:

$$Y'_J = D_{j+2}\,(C_{-1}\, p_{-1}) + D_{j-1}\,(C_{-1}\, p_0 + C_0\, p_{-1}) + D_{j-1}\,(C_0\, p_1 + C_1\, p_0 + D_{j-2}\,(C_1\, p_1$$

For good data transmission, the desired equalizer output signal $Y_j$ should contain only the term including the coefficient $D_j$. The remaining terms representing the intersymbol interference should be reduced to a minimum. This can be accomplished in the example given by equating the following coefficients in the above equation to zero:

$$C_{-1}p_0 + C_0\, p_{-1} = 0 \text{ and}$$
$$C_0p_1 + C_1\, p_0 = 0$$

Since $C_0$ and $p_0$ can be normalized to unity, this results in the following equations:

$$C_{-1} = -p_{-1} \text{ and}$$
$$C_1 = -p_1$$

With reference to these equations, it is apparent that if the products $C_{-1}p_{-1}$ and $C_1p_1$ are sufficiently small so as to not cause any significant performance degradation, then the equilization is satisfactory. If not, then more equalizer multiplying taps must be added.

It follows that for the particular values of $h_k$ given in the example, equalization can be accomplished by setting the multiplying coefficients $C_{-1}$ and $C_1$ to −0.2 and 0.2, respectively. Then the equalizer output signal $Y_j$ can be expressed as follows:

$$YI = D_{j+2}(-0.04) + D_{j+1}(0) + D_j(0.04 + 1.08 + 0.04) + D_{j+1}(0) + D_{j-2}(-0.04)$$

It is now apparent that these particular multiplying coefficients reduce the intersymbol interference from 0.4 to less than 0.08 after renormalizing the $D_j$ coefficient to unity. This reduction in the delay and attenuation distortion caused by the leading and trailing intersymbol interference is the primary objective of the equalization network 57.

It should be noted that in the elementary analysis, only the in-phase baseband signal and the in-phase transversal equalizer have been considered. Nonetheless it is now apparent that partial response detected data signals can be used to accomplish equalization. Furthermore an expansion of this basic concept and analysis will show that a pair of transversal equalizer can be used to equalize an entire passband, and two pair of transversal equalizers can be used to equalize a double sideband quadrature amplitude modulated signal.

In this particular implementation, an automatic adaptive equalization technique has been described that is specifically implemented for, but not necessarily limited to, operation with the (1,1) partial response signaling technique. The equalization technique is designed for simple and inexpensive all-digital implementation. It corrects for asymmetrical as well as symmetrical attentuation and delay distortion occurring on telephone channels. The particular implementation described utilized the detected partial response signals DI and DQ to effect equalization. This allows the equalization network 57 to be placed ahead of the phase correction loop, thus providing for a much improved high-frequency phase jitter correction capability. The equalization network 57 learns on random data transmission, and does not require the use of any special tones or transmission preamble. It also utilizes the majority vote of both channels to effect a fast as well as an effective equalization capability.

Proceeding with a discussion of the phase correction network 59, it will be noted that if the (1,1) partial response signaling is perfect, and there is no channel distortion, the signals at the input to the phase correction network 59 can be expressed as follows:

$$YI'_j = DI\ l_0 \cos\phi + DQ\ l_0 \sin\phi \qquad (13)$$

$$YQ'_j = DQ\ l_0 \cos\phi - DI\ l_0 \sin\phi$$

where $DI$ and $DQ$ are the signal outputs of the detectors 61 and 63, $l_0$ is the first sampled value of the impulse response, and $\phi$ is an angle which results from the undesirable phase and frequency offsets and phase jitter.

In order to achieve the desired result wherein YI and YQ equal DI $l_0$ and DQ $l_0$, respectively, it is generally desirable that the phase correction network 59 remove the sin$\phi$ and cos$\phi$ terms from Equation 13. This can be accomplished by a phase lock loop such as that illustrated in FIG. 6. The phase lock loop includes the phase correction network 59, the detectors 61 and 63 in the respective I and Q channels, the error calculator 65, and a filter 140 connected between the error calculator 65 and the phase correction network 59.

The phase correction network 59 includes four multipliers 109, 111, 113, and 115. In the multipliers 109 and 111, the signal YI' provides the multiplicand, and in the multipliers 113 and 115, the signal YQ' provides the multiplicand. A sine/cosing ROM 117 ideally provides output signals for the sine of some variable angle $-\phi'$ and the cosine of the angle $-\phi'$, which are equivalent to $-\sin\phi'$ and $+\cos\phi'$, respectively. The cos $\phi'$ signal is introduced to the multipliers 109 and 115 to multiply the respective multiplicands therein. Similarly, the $-\sin\phi'$ signal is introduced to the multipliers 111 and 113 to multiply the multiplicands therein. An adder 119 is connected to add the products from the multipliers 109 and 113, and a differential adder 121 is connected to the multipliers 111 and 115 to provide a difference in their products. It follows that the signals from the adders 119 and 121, which are introduced to the in-phase and quadrature channels respectively, can be expressed as follows:

$$YI_j = YI'_j \cos\phi' - YQ'_j \sin\phi'$$

(Previously designated Equation 5)

$$YQ_j = YQ'_j \cos\phi' + YI'_j \sin\phi'$$

Now, if the angle $\phi'$ of the ROM 117 is equal to the angle $\phi$ resulting from the phase jitter and offset, a substitution of Equation 13 into Equation 5 will show that $YI = DI\ l_0$ and $YQ = DQ\ l_0$. This, of course, is the desired result.

From the foregoing analysis, it is apparent that, if the sine-cosine ROM 117 is providing sine and cosine values of an angle $\phi'$ equal to the angle $\phi$, the desired data can be detected. Although this is the ideal situation, in practice the angle $\phi'$ of the ROM 117 may differ slightly from the angle $\phi$. For this reason, it is particularly desirable that the angle $\phi'$ of the sine/cosine ROM 117 be updated in order to compensate for variations in the phase error. It is also of importance that this phase angle correction be made as rapidly as possible so that the system can track rapid changes in the phase error. To accomplish this purpose, a phase lock loop including the phase correction network 59 and the error calculator 65 is provided to update the angle $\phi'$ of the ROM 117.

One of the functions of the error calculator 65 of FIG. 4 is to generate a particular error signal $E_{PLL}$ for the phase lock loop. Thus, the error signal calculator 65 can be provided with a comparator 123 having one input terminal connected to ground 125 and another input terminal connected to receive the signal YI. The comparator 123 is adapted to determine the sign of the signal YI and to introduce this sign to a multiplier 127. A comparator 129, which is similarly connected to the reference potential 125, is adapted to receive the signal YQ and to introduce the sign of the signal YQ to a multiplier 131.

The EI signal on the terminal 70 can be introduced to the multiplier 131, and the EQ signal on the terminal 72 can be introduced to the multiplier 127. The product provided by the multiplier 131 can be introduced to the positive terminal of a differential adder 137, and the product from the multiplier 127 can be introduced to the negative terminal of the adder 137. The output of the adder 137 can then be expressed as the quantity EI SGN(YQ) − EQ SGN(YI). In the preferred embodiment, this quantity is introduced to a network 139 wherein it is multiplied by a variable gain control having a transfer function K, which is derived from the Di and DQ signals of the detectors 61 and 63. The function K can be expressed as follows:

$$K = \frac{1}{|DI| + |DQ|} \qquad (14)$$

The particular value of K will depend upon the absolute values of DI and DQ which in turn depend upon the particular encoding operation used in the system. For example, an encoded data sample DI may be provided by combining the value of the present data sample dI with the value of the preceding data sample $dI_{-1}$. It follows that if the data samples $DI$ have two values, such as +1 and −1, the encoded data sample DI can have three values, such as +2, 0, and −2. This is commonly referred to as 2/3 operation which can be tabulated as follows:

2/3 Operation

| dI | $dI_{-1}$ | DI |
|---|---|---|
| +1 | +1 | +2 |
| +1 | −1 | 0 |
| −1 | +1 | 0 |
| −1 | −1 | −2 |

Another type of operation is used in the preferred embodiment wherein the data samples $dI$ can have four values, such as +3, +1, −1, and −3, so that the encoded data samples DI can have seven values. This 4/7 operation is tabulated below.

4/7 Operation

| dI | $dI_{-1}$ | DI |
|---|---|---|
| +3 | +3 | 6 |
| +3 | +1 | 4 |
| +3 | −1 | 2 |
| +3 | −3 | 0 |
| +1 | +3 | 4 |
| +1 | +1 | 2 |
| +1 | −1 | 0 |
| +1 | −3 | −2 |
| −1 | +3 | 2 |
| −1 | +1 | 0 |
| −1 | −1 | −2 |
| −1 | −3 | −4 |
| −3 | +3 | 0 |
| −3 | +1 | −2 |
| −3 | −1 | −4 |
| −3 | −3 | −6 |

Values for DQ can be similarly derived from the corresponding levels of the data samples $dQ$. Finally, the particular values of K can be determined by substituting the values of DI and DQ into Equation 14. In the foregoing manner, the output of the adder 137 is multiplied by this transfer function K in the network 139 to provide the following error signal $E_{PLL}$ for the phase lock loop:

$$E_{PLL} = \frac{EI\ SGN(YQ) - EQ\ SGN(YI)}{|DI| + |DQ|} \qquad (15)$$

In a double sideband system which is not quadrature modulated, the error signal ($E_{PLL}$) for the phase lock loop can be expressed as follows:

-Continued $$E_{PLL} = \frac{EQ\ SGN(YI)}{|DI|}$$

This particular signal can be implemented in a manner similar to that disclosed for deriving Equation 15. To accommodate single sideband transmissions, modifications of the signal $E_{PLL}$ can be made to eliminate cross channel terms.

It will now be shown that for small angles of $\phi$, and $\phi'$ Equation 15 provides a phase lock loop error signal $E_{PLL}$ which is equal to $\phi - \phi'$ or $\Delta\phi$. Substituting Equation 13 into Equation 5 and then substituting Equation 5 into Equation 6, this error signal can be expressed as follows:

$$EI = [DIl_0 \cos\phi + DQl_0 \sin\phi] \cos\phi' - (DQl_0 \cos\phi - DQl_0 \sin\phi] \sin\phi' - DI\hat{l}_o$$

Simplifying, $$EI = DIl \cos(\phi - \phi') + DQl_0 \sin(\phi - \phi') - DIl_0.$$

If $(\phi - \phi') = \Delta\phi$, then for small angles of $\Delta\phi$, cos $\Delta\phi = 1$.

Then, $$EI = DI\,(l_0 - \hat{l}_0) + DIl_0 \sin\Delta\phi \qquad (16)$$

The first term in Equation 16 is corrected in a manner discussed below with respect to system threshold learning. The second term in Equation 16 remains uncorrected, so as far as the phase lock loop is concerned, $$EI = DQl_0 \sin\Delta\phi \qquad (16a)$$

By a similar derivation it can be shown that $$EQ = -DQl_0 \sin\Delta\phi \qquad (16b)$$

It follows that the quantities in the numerator of Equation (15) can also be expressed as follows since the signs of YI and YQ will be the same as the signs of DI and DQ, respectively:

$$EI\ SGN\,(YQ) = |DQ|\ l_o \sin\Delta\phi \qquad (17)$$

$$EQ\ SGN\,(YI) = |DI|\ l_0 \sin\Delta\phi$$

substituting Equation 17 for Equation 15, it is apparent that $E_{PLL}$ equals $l_o \sin\Delta\phi$; and for angles of $\phi$ much less than one radian, $E_{PLL}$ equals $l_0\Delta\phi$. For $l_0$ normalized to one, it follows that $E_{PLL}$ becomes $\Delta\phi$ radians as predicted.

Figure 6:
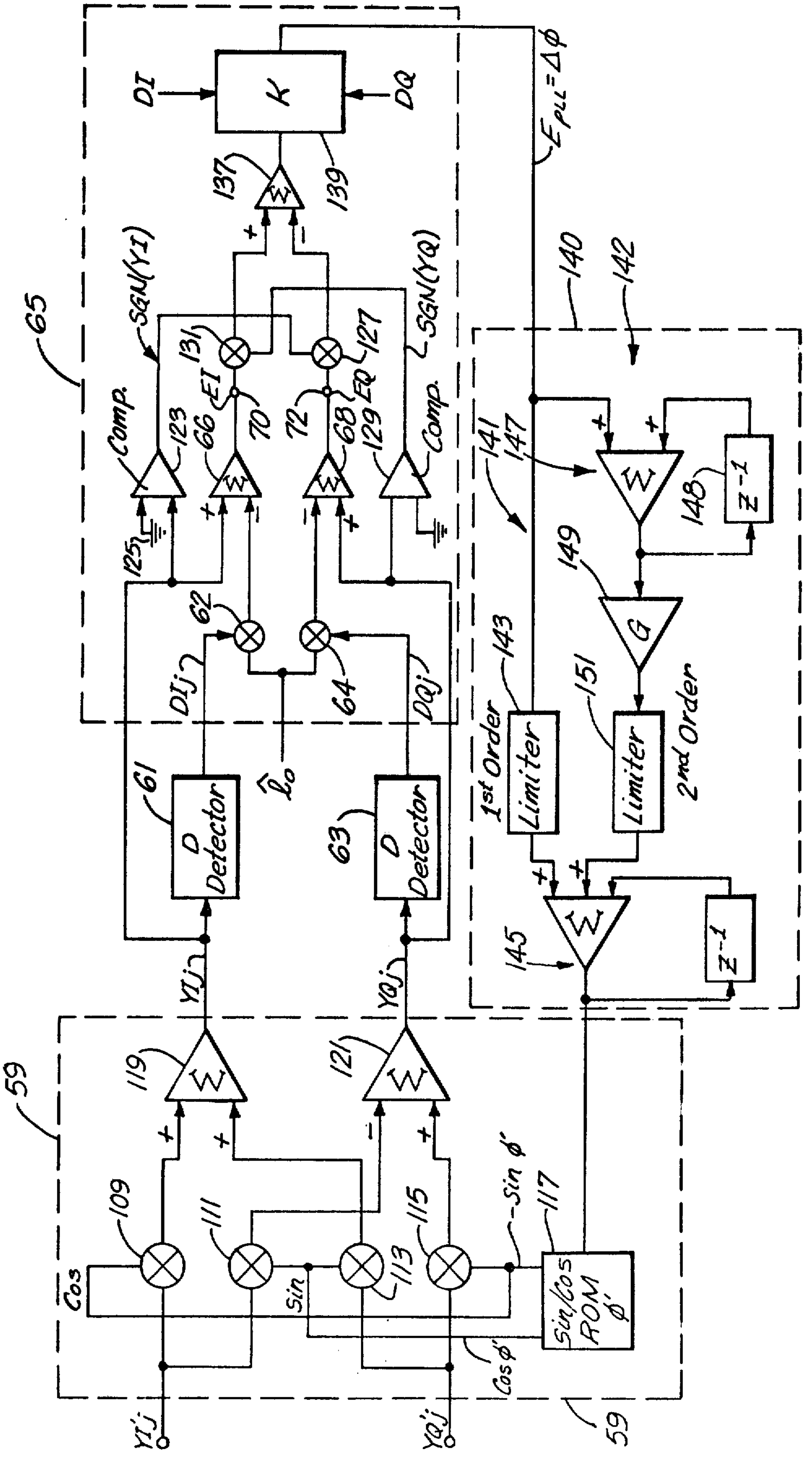
FIG. 6 is a block diagram of the embodiment of the phase lock loop shown in FIG. 3.

The phase lock loop is shown in greater detail in FIG. 6. In addition to the phase correction network 59 and the error calculator 65, the phase lock loop includes the detectors 61 and 63, and the filter 140 which can be connected between the error calculator 65 and the ROM 117 in the network 59. In response to the error signal $E_{PLL}$, the filter 140 provides means for updating the angle $\phi'$ of the sine/cosine ROM 117. To accomplish this purpose, the filter 140 may include a first-order branch and a second order branch, shown generally at 141 and 142, respectively. The error signal, $E_{PLL}$, is preferably introduced to a limiter 143 in the first-order branch 141. The limiter 143 can be set to pass only phase angle differential $\Delta\phi$ within a range of ±3° to control the rate of phase correction. The limited differential $\Delta\phi$ can then be introduced also to an intergrator shown generally at 145.

The second-branch 142 of the filter 140 can include a cumulative adder 147 functioning as an integrator 147. The adder 147 is preferably disposed to receive the error signal $E_{PLL}$ on one of its input terminals. Another of the input terminals of the adder 147 is connected to the output of the adder 147 through a delay 148. In the preferred embodiment, the output of the adder 147 is also connected to a digital multiplier 149 which provides means for adjusting the gain G of the phase lock loop. The amplified signal can then be introduced through a limiter 151 to the integrator 145. In the preferred embodiment, the limiter 151 is set to pass only degree differentials within the range of ± 1°. Thus, the limiters 143 and 151 insure that the phase lock loop does not overcompensate for apparently large fluctuations in the error signal $E_{PLL}$.

The amplifier 149 is desirable to establish the bandwidth of the phase lock loop. Although it is apparent that an amplifier can be provided in each of the branches 141 and 142, it is the relative magnitude of the gains in the branches 141 and 142 which is of primary concern. For this reason, in the preferred embodiment the amplifier in the branch 141 is normalized to one and the amplifier 149 in the branch 142 is provided with a gain of 0.01.

As previously noted, the phase offset is characterized by a difference in the carrier phase of the transmitter 13 and receiver 21. This condition can be overcome in the initial correction of the phase lock loop. Then when $\phi'$ is substantially equal to $\phi$, the remaining corrections are those responsive to the continuously varying phase caused by either frequency offset or phase jitter.

The frequency offset of the incoming signal varies the phase angle $\phi$ in a linear manner with time while the phase jitter of the incoming signal varies the phase angle $\phi$ in a nonlinear, generally sinusoidal, manner with time. The integrator 147 is responsive to the linear changes of the phase differential $\Delta\phi$, so that the second-order branch 142 compensates for the frequency offset of the received signal. However, the first-order branch 141 is responsive to the nonlinear fluctuations of the phase angle $\Delta\phi$ so that the first-order branch 141 compensates for the phase jitter and the phase offset of the received signal.

The output of the integrater 145, which provides the angle $\phi'$ to the ROM 117 is provided with a feed back loop 153 so that the inputs to the integrater 145 include not only the updating information from the first and second order branches 141 and 142, but also the previous angle $\phi'$. In this manner, the angle $\phi'$ of the ROM 117 is maintained substantially at the angle $\phi$ so that the undesirable phase terms in the equalized signals YI' and YQ' can be substantially eliminated by the phase correction network 59.

By way of example, it will be noted that if the phase angle $\phi$ is 50° and the phase angle $\phi'$, as calculated in the preceding baud interval is 49°, $E_{PLL}$ will equal $\Delta\phi$ or +1°. Since this differential is within the preferred range of the limiter 143, the quantity will be passed to the integrator 145. In the integrator 145, the differential angle of +1° will be added to the previous angle $\phi'$ so that the updated $\phi'$ is equal to 50°. In this manner, the angle $\phi'$ of the sine/cosine ROM 117 can be made equivalent to the angle $\phi$ in the YI' and YQ' signals. Since the corrections provided by the second-order branch 142 are dependent on the prior history of the signal $E_{PLL}$, they were not considered in this elementary example.

It is of particular interest that the branches 141 and 142 receive the same input signal, $E_{PLL}$, and each provide an input to the integrator 145. This enables the integrator 145 to provide a single output signal $\phi'$ for use by a single phase correction network 59. It is also of interest that those elements of the receiver, which have significant delay characteristics, are excluded from the phase lock loop. More specifically, it will be noted that the entire phase lock loop follows the lowpass filters 53 and 55 and the equalization network 57. This enables a phase error to be calculated by the error calculator 65 and signal $\phi'$ provided by the filter 140 in the period of a single baud interval.

Although described with primary reference to a quadrature amplitude modulated system using (1,1) partial response signaling, it has already been shown that the phase lock loop is also applicable to other pulse amplitude modulated systems. Furthermore, this phase lock loop can be used with other types of partial response signaling. More specifically, any partial response signals DI, DQ which are derived from the data signals $dI$, $dQ$ can be used to calculate the phase error.

As illustrated in FIG. 3, the YI and YQ signals from the phase correction network 59 can be introduced into the detectors 61 and 63 wherein the partial response signals DI and DQ are respectively detected. The decision threshold control 77 can be connected between the equalization control network 69 and the detectors 61 and 63 to automatically adjust the decision threshold value $l_o$ for both the in-phase and quadrature channels 49 and 51, respectively. This operation of the decision threshold control 77 is desirable for proper system operation to counteract for variations in signal level.

It will be recalled, with reference to Equation 6, that EI and EQ can be expressed as:

$$EI = YI - DI\,\hat{l}_o$$
$$EQ = YQ - DQ\,\hat{l}_o$$

where, as previously discussed, $\hat{l}_o$ is the estimate of $l_o$ derived by the decision threshold control 77. Substituting DI $l_o$ and DQ $l_o$ for YI and YQ, respectively, and combining terms, Equation (6) becomes $$EI = DI\,(l_o - \hat{l}_o)$$
$$EQ = DQ\,(l_o - \hat{l}_o) \qquad (18)$$

If the signs of both the I and Q channel error signals of Equation 19 are extracted and multiplied by the signs of both the I and Q channel detected signals DI and DQ, respectively, then the terms $E_1(n)$ and $E_2(n)$ of Equation 12 for the special case of $n$ equal to zero are formed by the equalization control network 69. Then it is obvious that $E_1(o)$ and $E_2(o)$ become independently, $$E_1(o) = E_2(o) = SGN\,(l_o - \hat{l}_o) \qquad (20)$$

Since independent equations are formed, both may be used in the decision threshold control 77 to provide information for updating the value of $\hat{l}_o$.

A typical control 77 might be of the type illustrated in FIG. 9 to include an integrator control network 195 connected to receive from the equalization control network 69 the error signals $E_1(o)$ and $E_2(o)$. The integrator 197 including a delay 199 which provides the estimate of $l_o$ previously designated $\hat{l}_o$.

Referring again to Equation 19, it is obvious that $(l_o - \hat{l}_o)$ is positive $\hat{l}_o$ is too small. This condition can be sensed by the integrator control network 195 so that the integrator 197 is incremented to raise the value of $\hat{l}_o$. Conversely, in response to a negative $(l_o - \hat{l}_o)$, the integrator control network 195 can decrement the integrator 197 to lower the value of $\hat{l}_o$. Other possible values of $E_1$ $(o)$ and $E_2$ $(o)$ can be treated in accordance with the following table to step the integrator 197.

| | | Integrator Control Network | |
|---|---|---|---|
| $E_1(o)$ | $E_2(o)$ | Increment Steps | Decrement Steps |
| + | + | 2 | |
| + | 0 | 1 | |
| + | − | | |
| 0 | + | 1 | |
| 0 | 0 | | |
| 0 | − | | 1 |
| − | + | | |
| − | 0 | | 1 |
| − | − | | 2 |

where $E_1$ $(o)$ and $E_2$ $(o)$ are $E_1$ $(n)$ and $E_2$ $(n)$, respectively, of Equation 12 for the particular case of $n$ equal to zero.

From the output of the integrator 97, the estimate $\hat{l}_o$ can be introduced to a decision reference multiplier 201 to provide the reference quantities $\pm \hat{l}_o$ for 2400 bps operation and the additional reference quantities $\pm 3\hat{l}_o$ and $\pm 5\hat{l}_o$ for 4800 bps operation. There reference quantities can be introduced to the detectors 61 and 63 on the conductor 203. In the detectors 61 and 63, these reference quantities can be used as limits within which a particular YI or YQ signal level will be detected as one of the 3 levels in 2/3 operation or one of the seven levels in 4/7 operation. For example, in 2/3 operation, if the particular YI signals are as indicated in the following table, the corresponding values of DI will be detected.

| Signal | 2/3 Operation Detection (DI) |
|---|---|
| $\hat{l}_o \leq YI$ | 2 |
| $-\hat{l}_o \leq YI \leq \hat{l}_o$ | 0 |
| $YI < -\hat{l}_o$ | −2 |

In the 4/7 mode of operation, the decision reference multiplier 201 provides levels of $5\hat{l}_o$, $3\hat{l}_o$, $\hat{l}_o$ $-\hat{l}_o$ $-3\hat{l}_o$, and $-5\hat{l}_o$ for the detection of the partial response signals as shown below:

| Signal | 4/7 Operation Detection (DI) |
|---|---|
| $5\hat{l}_o < YI$ | 6 |
| $3\hat{l}_o < YI \leq 5\hat{l}_o$ | 4 |
| $\hat{l}_o < YI \leq 3\hat{l}_o$ | 2 |
| $-\hat{l}_o \leq YI \leq \hat{l}_o$ | 0 |
| $-3\hat{l}_o \leq YI < -\hat{l}_o$ | −2 |
| $-5\hat{l}_o \leq YI < -3\hat{l}_o$ | −4 |
| $YI < -5\hat{l}_o$ | −6 |

In a similar manner, the detector 63 provides the symbols DQ from the signal YQ in response to threshold values provided by the decision threshold control 77.

The timing of the sampler 45 is particularly critical. If the samples of the incoming signal are not taken at the data rate of the transmitter 13, such as 4800 times per second, the detected data forwarded to the data processing apparatus 23 may not correspond to that initiated by the data processing apparatus 11.

One technique for timing the sampler 45 can be best explained with reference to FIG. 7 which shows a partial eye pattern of the YI signal which appears immediately prior to the detector 61. This eye pattern illustrates the seven possible signal levels of the YI or YQ signal at the consecutive sampling times of $T_{-1}$, $T_O$, and $T_{+1}$. These signal levels correspond to the seven possible values of the quantity detected signals DI or DQ in 4/7 operation. The eye pattern includes a first group of signals 153 which had seven different levels at the time $T_{-1}$, but each of which has a value of zero at the time $T_O$. A second group of signals 155 each has a value of zero at the time $T_O$, and will have one of seven different values at the time $T_{+1}$. In a preferred embodiment, the signals DI or DQ in adjacent bauds cannot differ by more than three levels. For example, if DI had a value of +2 then the next DI might have any of the seven values except −6 which would be separated from +2 by more than three levels. Thus, the groups of signals 153 and 155 are merely illustrative of the fact that, in a given sampling interval, a signal can originate at one of seven different levels and terminate at any one of four to seven different levels not spaced more than three levels from the preceding level. It follows that one of 37 different signals can occur between the particular sampling interval. Therefore, a full eye pattern of the YI signal might illustrate a bunching of signals at each of the seven levels at each of the sampling times.

It is of course, preferable that the samples be taken by the sampler 45 at times corresponding to the bunching of the signals. These times are preferred since the different signals levels can be most easily distinguished at those times. This can be appreciated with reference to a third group of signals 157 which are shown only partially in FIG. 7 in order to illustrate the bunching of the possible signals, and the preferred timing of the samples. Although several possible signals are shown in FIG. 7, it is apparent in any given time interval that only a single signal will be present in the eye pattern. For example, the eye pattern may consist of a single signal 159 at the time interval illustrated. If the timing of the sampler 45 is accurate, the signal 159 will be detected at the time $T_o$ when the YI signal corresponds exactly to the DI$l_o$ level of — . If the signal 159 is detected at an earlier time, such as $T_E$, or at a later time, such as $T_L$, there will be a difference between the magnitude of the YI signal and DI$l_o$ level. It will be noted that this difference is provided by the error calculator 65 in the error signal EI.

By way of example, it will be noted that a point 161, corresponding to the time $T_L$, the error signal EI will have a positive value. However, at a point 163, corresponding to the time $T_E$, the signal EI will also have a positive value, so that the points 161 and 163 are not distinguishable merely by the sign of the signal EI. Fortunately, points such as 161 and 163 which would provide EI with the same sign can be distinguished by the slope of the signal 159 as it passes through the respective points 161 and 163. For example, it will be noted that the slope of the signal 159 at the point 161 is positive while the slope of the signal at the point 163 is negative. In fact, it can be shown that any signal DI sampled at a time $T_E$ will provide a positive EI with a negative slope, or a negative EI with a positive slope. It follows that any signal DI sampled early will correspond to a product of the error signal EI and a slope $(DI - DI_{-1})$ which is negative. Conversely, any signal DI which is sampled at a time $T_L$ will correspond to a product of the error signal EI and the slope $(DI_{+1} - DI)$ which is positive. Therefore, by monitoring the sign of a timing error function $$T = \Sigma EI(DI - DI_{-1}) + \Sigma EI(DI_{+1} = DI) \quad (20)$$

the timing can be found to be either early if T is negative or late if T is positive, and the timing can be corrected accordingly. If the timing is early, the left-hand summation in Equation 20 will be consistently negative while the right-hand summation will average zero over several bauds. Thus, T will become negative and the timing can be corrected accordingly. If the timing is late, the right-hand summation in Equation 20 will be consistently positive while the left-hand summation will average zero. Then T will be positive and the timing can be appropriately advanced. Equation 20 can also be simplified to $$T = \Sigma EI(DI_{+1} - DI_{-1}) \quad (21)$$

Thus, timing can be controlled by the error signals EI and the slopes of the YI signal as determined by the values of the detected signals $DI_{-1}$, and $DI_{+1}$ at the times $T_{-1}$, $T_0$, and $T_{+1}$, respectively. However, the quantity $DI_{+1}$ is unavailable at the present time $T_0$ when the timing error is preferably determined. This can be circumvented by noting that $$EI(DI_{+1} - DI_{-1}) = EI_{-1}(DI - DI_{-2})$$

where $ET_{-1}$ corresponds to the error signal at the time $T_{-1}$, and $DI_{-2}$ is DI at a time $T_{-2}$ preceding the time $T_{-1}$. Therefore, with proper substitution, the timing error function T can be rewritten as follows in terms of the quantities known at time $T_0$:

$$T = \Sigma EI_{-1}(DI - DI_{-2}) \quad (22)$$

Equation 22 can be further simplified by noting that the sign of the multiplying quantity $EI_{-1}$ supplies the required sense information. This results in Equation 23 which can be more easily implemented to simplify storage of the multiplying quantities.

$$T = \Sigma SGN\ (EI_{-1})\ (DI - DI_{-2}) \quad (23)$$

This timing error function T can be derived by the timing control network 166 shown in block form in FIG. 8. The SGN (EI) signal from the signal calculator 65 can be fed sequentially into a pair of registers 167 and 169 corresponding to the specific error signals EI and $EI_{-1}$, respectively. The SGN $(EI_{-1})$ from the register 169 can be introduced to a multiplier 173. Similarly, the DI signals from the detector 61 can be sequentially introduced into three registers 175, 176, and 177, which correspond to the symbols DI, $DI_{-1}$, and $DI_{-2}$, respectively. The DI and $DI_{-2}$ signals can be subtracted in a differential adder 179, and the resulting output $(DI - DI_{-2})$ introduced to the multiplier 173. The output of the multiplier 173 corresponds to the timing error function T set forth in Equation 21. This signal is introduced to an integrator 181, which detects change in the sign of the timing error function T.

In the preferred embodiment, a clock 183 having a high frequency such as 4.8 megacycles is connected to a baud rate generator counter 185. The counter 185 is provided to count a particular number of the pulses from the clock 183, the particular number corresponding to a given time interval. For example, the particular number may be 1000 so that, in a time interval of 1/4800 second, the counter 185 will count 1000 pulses having a frequency of 4.8 megacycles.

The counter 185 can be connected to the sampler 45 so that the interval of time over which the 1000 pulses are counted can control the sampling rate of the sampler 45, The timing control network 166 can be provided with means to increase or decrease the number of counts of the counter 185 so that the timing rate of the sampler 45 will be decreased or increased, respectively. This means can include a timing rate adjustment control 187 which can be adapted to receive the signal from the integrator 181 and to introduce this signal to an add or delete pulse circuit 189. The timing rate adjustment control 187 preferably includes a gate 189 which can be closed to introduce the sign of the timing function T to the add or delete pulse circuit 189. An adjustment rate counter 191, which preferably is responsive to the output of the counter 185, can be connected to the adjustment control 187 to control the interval over which the gate 189 is opened. It is desirable that this interval be greater than one baud to enable the system to adjust to timing corrections. For example, in the preferred embodiment, this interval of time is equal to 16 bauds.

In the preferred embodiment, the output of the pulse circuit 189 is connected to the counter 185. In response to the receipt of a plus sign from the integrator 181, the pulse circuit 189 will add an additional pulse to those counted by the counter 185 so that the duration over which the particular number of pulses is counted, is shortened. This will result in increasing the timing rate of the sampler 45. Similarly, upon receipt of a negative sign from the integrator 181, the pulse circuit 189 will delete a pulse from those counted by the counter 185 so that the timing rate of the sampler 45 is decreased.

The ratio between the frequency of the clock 183 and the particular count made by the counter 185 determines the amount of increase or decrease in the timing rate. Thus, where the frequency of the clock 183 is 4.8 megacycles and the particular count of the counter 185 is 1000 pulses, the deletion or addition of a single pulse by the pulse circuit 189 results in an advancement or retardation, respectively, of the timing rate by 1/4800 of a baud.

The preferred embodiments of the invention hereinabove described are of particular advantage in transmitting data over existing telephone lines. With the provision of (1,1) partial response signaling at 1200 symbols per second, This reduces the spacing between adjacent samples or in other words results in sampling at an earlier time such as $T_0$. Similarly, early sampling at a time such as $T_E$ retards the pulse rate to increase the spacing between adjacent samples, this results in sampling at a later time such as $T_0$. In this manner the sampling of the converter 45 can be continuously updated so that samples are taken at the points when the signals of the eye pattern converge. This provides the most accurate approximation of the sample DI and DQ which can then be equalized, phase connected, and detected.

The preferred embodiments of the invention hereinabove described are of particular advantage in transmitting data over existing telephone lines. With the provision of (1,1) partial response signaling at 1200 symbols per second, the modem of this invention can transmit data at a rate of 4800 bps with a baseband of only 600 Hertz, or 1200 Hertz in double sideband. For example, if the carrier of the transmitter 13 has a frequency of 1600 Hertz, the primary data channel will occupy the spectrum between 1000 Hertz and 2200 Hertz. Since this is the best part of the telephone line spectrum the telephone line can be easily equalized for satisfactory operation. Furthermore, this preferred spectrum does not vary greatly from line to line so that the modem can operate effectively over a very high percentage of the existing telephone lines. In most telephone lines, a primary data channel between 1000 and 2200 Hertz leaves sufficient spectrum for the transmission of a 150 bps frequency shift modulated simplex channel on each side of the primary data channel. In the present invention, the primary channel occupies the spectrum between 1000 Hertz and 2200 Hertz.

The equalization network 57 previously described is particularly adapted for use with a system having partial response signaling. It uses the detected data signals which are already available, thereby saving on the circuitry which might otherwise be used to determine and store the sign of the unequalized signal. It also uses a majority vote of both the in-phase and quadrature signals to enhance the accuracy of the equalization adjustment and the speed of equalization convergence.

The equalization network 57 compensates for the delay and attenuation distortion typically caused by the telephone transmission line 17. In response to the error signals EI and EQ, the multipliers of the equalizers 100, 102, 104, and 106 are automatically updated to correct for changes in the line characteristics. The transmitted signal need not be predistorted, and manual adjustments to the receiver are not required. It is also of significant advantage that the equalization network 57 corrects for intersymbol interference which leads as well as follows the signaling pulse. Furthermore, the network 57 is particularly adapted to use with a quadrature double sideband receiver which is itself highly desirable for the reasons set forth previously.

The preferred location of the phase correction network 59 is also particularly important. Since the low-pass filters 53 and 55 and the equalization network 57 produce some delay in the demodulation and detection of the data, it is desirable that these components be omitted from any correction loop, such as the phase lock loop, wherein a fast rate of response is desired. In the systems of the prior art, the phase lock loops have included the filters 53 and 55 and the equalization network 57 so that the transport delay has been significant. With the phase correction network 59 of the present invention, the phase lock loop does not include these delaying devices so that the transport delay is minimized. This enables the phase correction network 59 to be responsive to fast phase jitter so that even small deviations in the phase error can be corrected without over-compensating.

The timing control network 166 of the present invention is particularly advantageous since is provides for timing recovery and control in a digital system. The system need not relay upon analog signal transitions in order to establish a time reference. The network 166 is responsive to the same system error signal EI and EQ which provide for the updating of the other correction networks 57 and 59. The sign of the error signals EI and EQ is correlated with the slope of the respective signals YI and YQ to provide a timing error signal T. The network 166 provides a stream of pulses having a pulse rate which increases when the timing signal T is positive and which decreases when the timing signal T is negative. The magnitude of each increases or decrease in the pulse rate is variable but may be a value such as 1/4800 baud.

It is particularly important that the incoming data provides updating information for its timing, equalization, and phase correction. No pilot tone need be transmitted to provide a reference for error calculations. Furthermore, the error signals EI and EQ can be used for updating each of the networks to thereby conserve on the circuitry of the system.

Although the invention has been described with reference to particular embodiments, it will be obvious to those skilled in the art that the invention can be otherwise embodied. For this reason, the scope of the invention should be ascertained only with reference to the following claims.

We claim:

1. A transversal equalizer for correcting the delay and attenuation distortion of an input signal defined by a plurality of digital words, comprising:
- a plurality of shift registers sequentially receiving the digital words in the input signal;
- multiplying means coupled to the shift registers and responsive solely to partial response detected digital data signals to provide the multiplying means with respective multiplying coefficients for multiplying the digital words stored in the associated shift registers to provide a plurality of products; and
- adding means coupled to each of the multipliers for adding the products provided by the multipliers to provide an equalized signal substantially free of the delay and attenuation distortion.

2. The equalizer recited in claim 1 wherein the input signal sequentially received by the shift registers is a double-sideband quadrature amplitude modulated signal.

3. The equalizer set forth in claim 1 wherein the multiplier means is solely responsive to (1,1) partial response detected digital data signals to provide the multiplying coefficients.

4. The transversal equalizer recited in claim 1 wherein both the input signal and the equalized signal have noncoherent characteristics so that the equalizer operates in a noncoherent domain.

5. An equalization correction network adapted for use with a double-sideband amplitude modulated modem including a demodulator providing data samples and a detector providing partial response detected data signals in each of an in-phase channel and a quadrature channel, the equalization correction network comprising:
- first means for sequentially storing a plurality of the data samples in the in-phase channel;
- second means for sequentially storing a plurality of the data samples in the quadrature channel;

third means for multiplying each of the data samples in the first means by one of a series of in-phase digital coefficients to provide a first plurality of in-phase products and for multiplying each of the data samples in the second means by the series of in-phase digital coefficients to provide a first plurality of quadrature products;

fourth means for multiplying each of the data samples in the first means by one of a series of quadrature digital coefficients to provide a second plurality of in-phase products and for multiplying each of the data samples in the second means by the series of quadrature coefficients to provide a second plurality of quadrature products;

fifth means for adding the first plurality of in-phase products from the third means and the second plurality of in-phase products from the fourth means to provide an equalized digital signal in the in-phase channel; and sixth means for differentially adding the first plurality of quadrature products from the third means and the second plurality of quadrature products from the fourth means to provide an equalized digital signal in the quadrature channel.

6. The equalization correction network recited in claim 5 wherein the data samples in both the in-phase and quadrature channels as well as the equalized signals in both the in-phase and quadrature channels have noncoherent characteristics so that the equalization network operates in a noncoherent domain.

7. The equalization network recited in claim 5 further comprising:

control means responsive to the partial response detected data signal provided by the detector for varying at least one of the multiplying coefficients in the series of in-phase digital multiplying coefficients of the third means and for varying at least one of the multiplying coefficients in the series of quadrature digital multiplying coefficients of the fourth means.

8. The equalization network set forth in claim 7 wherein the control means comprises:

seventh means responsive to the equalized signal in the in-phase channel and the partial response detected signal in the in-phase channel to provide a first error term;

eighth means responsive to the equalized signal in the quadrature channel and the partial response detected signal in the quadrature channel to provide a second error term;

ninth means responsive to the equalized signal in the quadrature channel and the partial response detected signal in the in-phase channel to provide a third error term;

tenth means responsive to the equalized signal in the in-phase channel and the partial response detected signal in the quadrature channel to provide a fourth error term;

eleventh means responsive to at least one of the first error term of the seventh means and the second error term of the eighth means to vary at least one of the in-phase coefficients of the third means; and twelfth means responsive to at least one of the third error term of the ninth means and the fourth error term of the tenth means to vary at least one of the quadrature coefficients of the fourth means.

9. The equalization network recited in claim 8 wherein:

the first, second, third and fourth error terms each have one of first characteristics indicating that the associated multiplying coefficient should be higher in magnitude, second characteristics indicating that the associated multiplying coefficient should be lower in magnitude, and third characteristics indicating that the magnitude of the associated multiplying coefficient should not be changed;

the eleventh means is responsive to the first and second error terms to increment at least one of the in-phase multiplying coefficients at least one step when one of the first and second error terms has the first characteristics and neither of the first and second error terms has the second characteristics, and to decrement at least one of the in-phase multiplying coefficients at least one step when one of the first and second error terms has the second characteristics and neither of the first and second error terms has the first characteristics; and the twelfth means is responsive to the third and fourth error terms to increment at least one of the quadrature multiplying coefficients at least one step when one of the third and fourth error terms has the first characteristics and neither of the third or fourth error terms has the second characteristics, and to decrement at least one of the quadrature multiplying coefficients at least one step when one of the third and fourth error signals has the second characteristics and neither of the third and fourth error terms has the first characteristics.

10. The equalization network recited in claim 9 wherein:

the eleventh means is responsive to the first and second error terms both having the first characteristics to increment at least one of the in-phase multiplying coefficients by more than one step, and is responsive to the first and second error terms both having the second characteristics to decrement at least one of the in-phase multiplying coefficients by more than one step; and the twelfth means is responsive to the third and fo fourth error terms both having the first characteristics to increment at least one of the quadrature multiplying coefficients by more than one step, and is responsive to the third and fourth error signals both having the second characteristics to decrement at least one of the quadrature multiplying coefficients by more than one step.

11. An equalization network adapted for use in a double-sideband quadrature amplitude modulated system having an in-phase channel and a quadrature channel for correcting at least one of asymmetrical and symmetrical delay and attenuation distortion of transmitted data to provide an equalized signal in each of the in-phase channel and the quadrature channel, comprising:

equalization means including at least one multiplier providing a plurality of variable coefficients for multiplying the data to correct for at least one of the symmetrical and asymmetrical distortion in at least one of the in-phase and quadrature channels;

a control network providing at least a first error term having characteristics dependent upon a first group of the data and a second error term having characteristics dependent upon a second group of the data independent of the first group of the data, the first and second error terms being correlated to provide for the adjustment of the multiplying coefficients of the equalizer means.

12. The network recited in claim 11 wherein the control network is responsive to (1,1) partial response detected data signals to provide the first and second error terms.

* * * * *